United States Patent
Leu

(10) Patent No.: US 9,129,237 B2
(45) Date of Patent: Sep. 8, 2015

(54) INTEGRATED INTERFACING SYSTEM AND METHOD FOR INTELLIGENT DEFECT YIELD SOLUTIONS

(75) Inventor: Iyun Leu, Hsinchu (TW)

(73) Assignee: ELITETECH TECHNOLOGY CO., LTD., Hsinchu County (TW)

( * ) Notice: Subject to any disclaimer, the term of this patent is extended or adjusted under 35 U.S.C. 154(b) by 923 days.

(21) Appl. No.: 13/338,604

(22) Filed: Dec. 28, 2011

(65) Prior Publication Data

US 2013/0173041 A1 Jul. 4, 2013

(51) Int. Cl.
G06F 19/00 (2011.01)
G06Q 10/06 (2012.01)

(52) U.S. Cl.
CPC ........... *G06Q 10/06* (2013.01); *G06Q 10/06395* (2013.01)

(58) Field of Classification Search
CPC .................. G06Q 10/06; G06Q 10/06395
USPC ........ 700/105, 108–110, 121; 716/51, 52, 55, 716/56, 106, 112
See application file for complete search history.

(56) References Cited

U.S. PATENT DOCUMENTS

| | | | |
|---|---|---|---|
| 6,097,887 A * | 8/2000 | Hardikar et al. | 717/105 |
| 7,886,238 B1 * | 2/2011 | Sharma et al. | 716/132 |
| 2007/0156379 A1 * | 7/2007 | Kulkarni et al. | 703/14 |
| 2011/0296362 A1 * | 12/2011 | Ishikawa et al. | 716/112 |

* cited by examiner

*Primary Examiner* — Kenneth M Lo
*Assistant Examiner* — Chad Rapp
(74) *Attorney, Agent, or Firm* — Li & Cai Intellectual Property (USA) Office

(57) ABSTRACT

Disclosed is an integrated interfacing system for intelligent defect yield solutions. The integrated interfacing system is configured to have a web server, which initiates a web interface for containing a plurality of functional items provided for clicking to activate a corresponding function. Through the graphical user interface, users may select one or more functions for viewing the multiple solutions regarding wafer yield. The system uses a memory to store the computer-executable instructions for selectively performing corresponding functionalities. When the wafer images are inputted through the interface, the system performs a defect coordinate conversion, dashboard summary, defect screening, defect sampling, defect yield diagnosis, design for yield, yield prediction, pattern diagnosis, data management, and system administration. By the interfacing system, an additional viewing method is also introduced to provision of full-chip viewing over the data retrieved during the wafer manufacturing procedure.

23 Claims, 31 Drawing Sheets

INTEGRATED INTERFACING SYSTEM AND METHOD FOR INTELLIGENT DEFECT YIELD SOLUTIONS

BACKGROUND OF THE INVENTION

1. Field of the Invention

The present invention relates to an integrated interfacing system and a method thereof for intelligent yield solutions, more particularly, to provide a web site having pages which present the tools of browsing and analyzing the wafer defect detections.

2. Description of Related Art

In the process of manufacturing the integrated circuit (the "IC"), thin film deposition, mask exposure, lithography, and etching are the necessary steps. However, it is still hard to avoid the random particle defects and systematic defects resulting in debasing the yield during the manufacturing process. The lower yield may raise the cost of the chip.

Since the defects are major causes of yield loss for all integrated circuit products, many conventional solutions have been developed. The main subjective of yield improvement efforts is to identify and eliminate major yield limitations. In general, the defects can be caught by scanning a sample of IC wafers with in-line defect scan tools. The most common defect types are identified, after which an effort is made to find the source of these common defects and fix the problem.

With the development of the modern layout design, the size of IC layout is getting smaller, and the concerning defect that may affect the yield of product will be smaller. A fabrication plant for the wafer production is required to increase the defect scan tool's and test equipment's sensitivities for acknowledging most of the killer defects on the wafer. Therefore, a large number of the defects may be acquired due to the high-sensitivity detection. In fact, the non-killer defects may also be found out. Thus, identification and classification of the various defects become necessary for improving efficiency of checking all of the killer defects. The further solutions may be accordingly implemented. However, the current technology lacks of proper tools of viewing the defects since the larger number of defect reports are constantly produced.

In view of the foregoing, there is a need for providing the web-activated tools that addresses one or more of the above-identified considerations for users to function the browsing and analyzing the matters of wafers. Thus the detailed description directed to the invention is disclosed to provide a solution to the problem.

SUMMARY OF THE INVENTION

To provide a proper tool for wafer or IC producer to conveniently inspect the defects of wafer, an integrated interfacing system and a method thereof for intelligent defect yield solutions in accordance with the present invention are disclosed. The system integrates the various diagnosis and yield prediction tools into one aspect. Through the integrated interface, the wafer producer may fast and conveniently retrieve the information as required.

According to one of the embodiments, the integrated interfacing system for intelligent defect yield solutions according to the present invention includes a web server, which initiates a web interface for containing a plurality of functional items provided for uses to click to activate one or more corresponding functionalities. The system includes a memory having computer-executable instructions for selectively performing the corresponding functionalities.

In which, one of the functionalities presented on the web site is to provide an item for users to click to acquire the coordinates of defects of each wafer. Further functionality is to provide another item for users to click to having a dashboard summary serving to review information of categories of wafer lots. One of the functionalities is to provide one further item for users to click to perform screening the defects based on layout pattern and defect size at an earlier stage. Further, one further item is provided for users to click to perform sampling the defects based on layout pattern, equipment, and mask. Still further, one further item is provided for users to click to identify random particles, systematic defects, and defect types. Further, some more items are provided for users to click to perform design-for-yield improving the wafer yield based on a systematic defect pattern library, design for manufacturing, layout base, and a frequent failure defect pattern library, to perform yield prediction for determining cost for chip fabrication, estimating number of wafer fabrication, and identifying a new design, to perform defect classification, and identifying layout pattern group, to create a report and performing data mining, and to perform system administration.

Furthermore, the mentioned dashboard summary of the integrated interfacing system is exemplarily made by a dashboard summary module within the web server provided for viewing a low-yield lot, a R&D lot, a pilot product, a combo chip lot, and a search result. Some more mentioned modules are also introduced to activating, for example, the defect screening made by a defect screen module within the web server based on further information of layout based including layout-based pattern group (LPG), layout pattern group Pareto chart distribution, defect size Pareto chart distribution, and focus-exposure matrix diagram; the defect sampling made by a defect sample module within the web server based on further information of dummy pattern, design weak spot, and nuisance; the defect yield diagnosis is made by a defect yield diagnosis module within the web server which identifies the random particle, the systematic defect and provides one or more process parameters related to the defect type, defect yield, defect composition, and defect distribution; the design-for-yield is made by a design-for-yield module within the web server which performs a pattern matching based on the systematic defect pattern library and the frequent failure defect pattern library; the yield prediction is made by a yield prediction module within the web server which is performed based on an all-layers killer defect yield summary; and the pattern diagnosis is made by a pattern diagnosis module within the web server which is performed to classify the defects and identify one or more layout pattern groups for further hot spot analysis and pattern overlap analysis.

In one further aspect of the invention, an integrated interfacing method for intelligent defect yield solutions is introduced. The steps in the method include initiating a web interfacing service by a web server of an integrated interfacing system, wherein the web browsing service initiates a web page for containing a plurality of functional items provided for clicking to activate one or more corresponding functionalities; inputting a defect scan file and a design layout; performing defect screening; analyzing the defects and creating a result file; and creating and displaying a summary related to the result onto the web page.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

For providing a convenient and fast way for users to review (browse) or analyze the yield and the concerning defects in a production line of fabrication plant for semiconductor, disclosed are the integrated interfacing system and method for intelligent defect yield solutions in the instant disclosure. The integrated interfacing system, in particular, is implemented by a web server which initiates a web site having a series of web pages through the homepage technologies. The users may thereby access the system containing a variety of defect data and related information over a network by using a web browser.

The study of the types of wafer defects may be learned by the users to improve the yield of integrated circuits in the fabrication plant. In the study, a high-sensitivity defect scan tool is used to scan and index the wafers in each lot. As the process goes on, a large number of scan data are produced and collected constantly. Through the study of the defect types, the defects may be classified into some types representing the various defect patterns which are concluded from a long term analysis.

Figure 1:
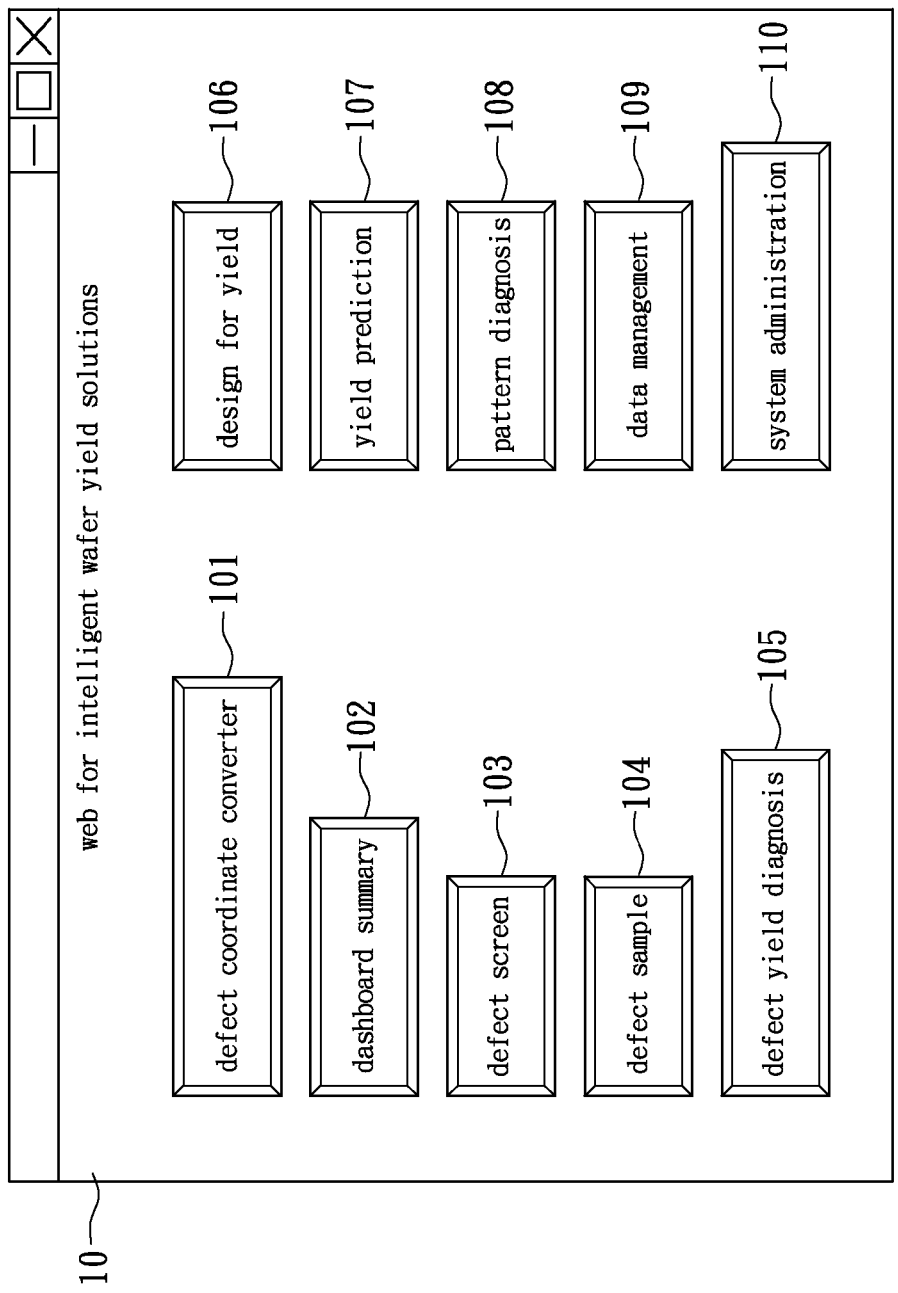
FIG. 1 shows a schematic diagram of a web page implemented by the integrated interfacing system for intelligent defect yield solutions in accordance with the present invention.

Reference is made to FIG. 1. FIG. 1 shows a schematic diagram of a web page implemented by the integrated interfacing system for intelligent defect yield solutions in accordance with the present invention. The web page is exemplarily initiated by a web server daemon. Through a web browser, the users may overlook the defects and the related patterns as required. The system implemented by the web server also provides the tools to perform diagnosis and analysis on the scanned data. In an exemplary example, a GUI (graphic user interface)-based web page 10 is configured to present the content shown in FIG. 1. The shown icons individually represent the items of several functionalities to implement the integrated interfacing system in accordance with the present invention.

While the sampled wafer is scanned by the in-line scanner, the images of one or more layers are generated and stored in the memory. A defect coordinate converter 101 may be presented as a functional button shown on the web page 10. When the "defect coordinate converter 101" is clicked, the mask data, design layout file, CAD layer information, defect scan tool reference information are required to be inputted. The defect coordinate converter 101 then processes a design and defect coordinate conversion which is operated to provide the automatic design and defect coordinate converter for any future defect diagnosis and metrology analysis in production.

The item "dashboard summary 102" is provided for users to have summary view of the system regarding the intelligent defect yield solutions. The summary includes the information regarding low-yield lot, R&D lot, pilot product, combo chip lot, customized functional lot, and the search tool.

The function "defect screen 103" is conducted to screen the scanned defects under some specified conditions. The "defects screen 103" is also provided to overlook the screened defects, including wafermap, die base, layout base, focus-exposure matrix (FEM), and Pareto chart distribution. Defect screen analyses defect scan data and specifies the suspect defects to take image from scanning electron microscope (SEM). The defect screen by layout based defect composite pattern group method helps identify potential systematic defect patterns and nuisance defect. The repeated scanning tasks and recognitions establish a pattern group library and create a lookup table for checking the types of defects.

In which, the image files for the wafer defects are created by a scanning electron microscope (SEM or optical microscope). Then the defects can be determined as some typical defect types either by human eyes or by some graphic recognition methods. The function "defect sample 104" allows the system to sample the wafers to be inspected. The defect sampled is also based on systematic defect pattern group for defect screen, and process, mask, weak design, defect sampling analysis, and the Pareto chart distribution. The "defect sample 104" provides sample summary, dummy pattern, pattern group, process defect, mask defect, random particle, weak design defect, and the nuisance.

The analysis regarding the sampled wafer(s) is generally used to perform yield prediction with respect to the whole unit of wafers. Next, the "defect yield diagnosis 105" is used to make diagnosis of the defects identified based on the defect classification and Pareto chart distribution.

A function "design for yield 106" is provided for the system to increase the yield by either reducing the defects in the manufacturing process, or modifying the design for avoiding the defects. Then the users may have a look over the whole design. Further, the yield can be improved by referring to a systematic defect pattern library, a design for manufacturing (DFM), a layout base, and the frequent failure defect pattern.

Next, one further function "yield prediction 107" is incorporated. Through this function 107 implemented by a program-enabled button as shown, the system is able to identify a chip design problem that results in low yield, predict the good die quantity, and determine the yield for manufacturing the chip based on wafermap, die base, composite defect yield, the good die quantity prediction, and Pareto chart distribution. The system thereby modifies the layout for enhancing yield, determines the cost of chip manufacturing, and estimates the production of wafers.

Further, the function "pattern diagnosis 108" is performed to measure pattern contour profile through category of the defect classification mode, the layout pattern group mode with similar pattern analysis, the hot spots mode after finding out hot pattern during metrology analysis, and the pattern overlapping analysis mode.

Still further, the function "data management 109", implemented by the program-enabled button on the webpage as shown, is provided for users to create report about the defect information, search the defect, and also perform data mining. The "system administration 110" is an administrative tool for system administration and user management.

Figure 2:
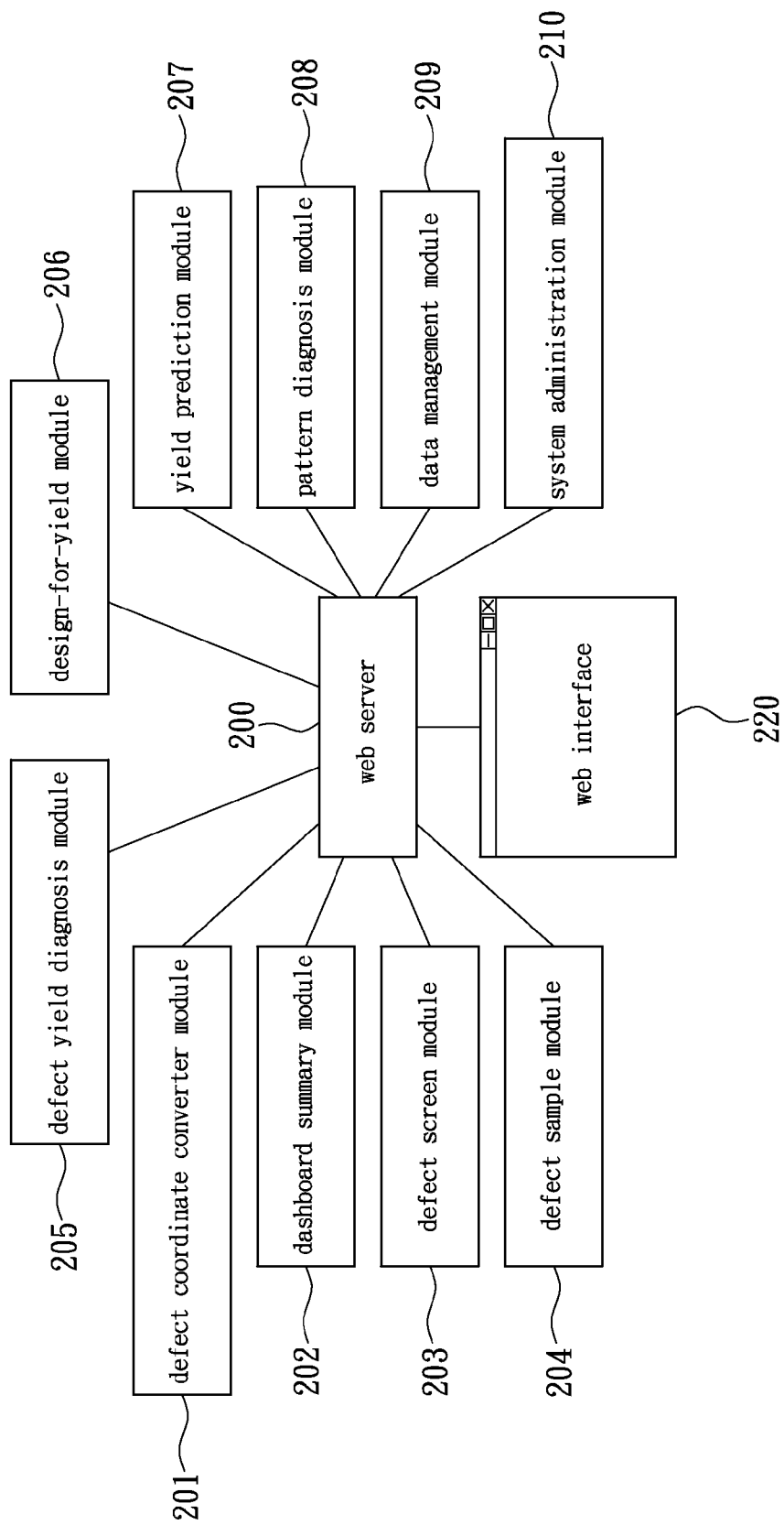
FIG. 2 shows a framework of the integrated interfacing system for intelligent defect yield solutions in accordance with the present invention.

FIG. 2 further shows a framework of the integrated interfacing system for intelligent defect yield solutions in accordance with the present invention.

The integrated interfacing system is preferably implemented by a web server 200. The web server 200 initiates a web interface 220 for users to access the system. To implement the functionalities described in FIG. 1, the web server 200 are correspondingly installed with a plurality of software modules which are stored in a machine-readable memory. In the system, the web server initiates one or more web pages for containing a plurality of functional items and their proprietary processes. The items, exemplarily implemented by the buttons or icons shown on the webpage, are provided for users to click to activate the corresponding functionalities. The system also includes a machine-readable medium, such as a memory device, that stores the computer-executable instructions for selectively performing corresponding functionalities.

The instructions stored in the memory are programmable for the users to make modifications. Preferably, the instructions are executed to activate various web functions for the integrated interfacing system for yield improvement. Followings are the exemplary descriptions related to the software modules provided by the claimed interfacing system.

Firstly, a defect coordinate converter module 201 is provided by the claimed system according to the present invention. This defect coordinate converter module 201 is used to perform the defect coordinate conversion which provides the sets of design layout coordinates of the defects in the wafer scanned by the defect scan tool. Since the interfacing system receives the input data of wafer scanning defect data, the web server 200 initiates an instruction to activate this defect coordinate converter module 201 to process the defect coordinate conversion.

A dashboard summary module 202 is initiated by the web server 200 for serving the users to comprehensively review the summary over the wafer data, especially overviewing the categories of the wafer lots and even the defects undergoing the processes of screening, sampling, classification, yield-prediction, diagnosis, etc.

The web server 200 further initiates a defect screen module 203 for performing a screening the defects based on the layout pattern and defect size predetermined at an earlier stage. The screening process may firstly acquire a certain range of the samples of the wafers.

Next, a defect sample module 204 in the system is used to perform sampling the defects based on the layout pattern, equipment, and mask. This defect sample module 204 is preferably made by the users' operations through the interfaces initiated by the web server 200.

Then, a defect yield diagnosis module 205 in the system is used to identify the random particles, systematic defects, and defect types by performing a series of diagnosis processes. When the defect yield diagnosis is processed, the result may show what the defect types causing most yield loss. Based on the users' requirements, the interfacing system follows the predetermined rules to perform the diagnosis for identifying the types of the defects after receiving the instructions. For example, the types can be identified based on the defect size, shape, and intensity depending on the scale of the manufacturing technology, and some conventional defined types including COPs (crystal-originated particle), bumps, dimples, residue, stains, scratches, and the like.

Further, a design-for-yield module 206 is introduced into the system. The design-for-yield module 206 is configured to improve the wafer yield based on a systematic defect pattern library, design for manufacturing, layout base, and a frequent failure defect pattern library. Further, the design-for-yield process determines the extent of parametric problems, and thereby identifies a chip design problem that results in yield loss.

A yield prediction module 207 is further initiated by the web server 200. The yield prediction module 207 is used to perform yield prediction for determining cost for chip fabrication, estimating number of good die for delivery, and thereby identifying a new design. The users may refer to the result of yield prediction to improve the manufacture of wafers since the cost and number are generally predicted at the earlier stage of the wafer fabrication process. For example, based on the yield prediction, the minimum dimensions or spacings may be identified as the critical regions on the wafers, and therefore the relevant masking steps, the photolithographic patterning steps, and etching steps can be improved.

Further, a pattern diagnosis module 208 initiated by the web server 200 is used to performing pattern metrology analysis in defect classification mode, and layout pattern group mode. A data management module 209 is also initiated by the web server 200, and used to administrate the data acquired by the interfacing system. The data management module 209 is operated by the users' instructions for creating a report and performing data mining. A system administration module 210 is used to administrate operations of the web server 200, such as system configuration and user management in the interfacing system.

Figure 3:
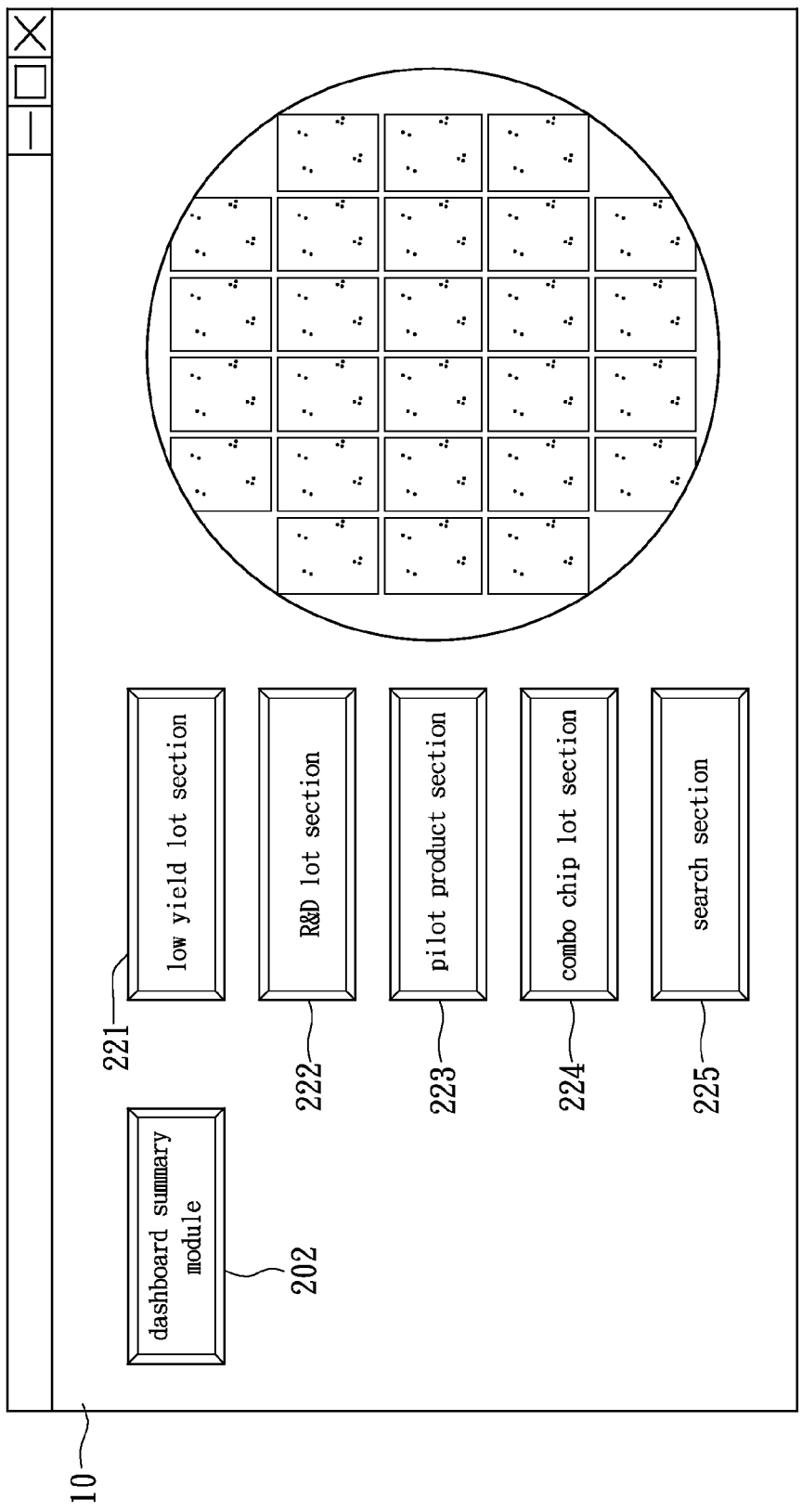
FIG. 3 shows a schematic diagram of a main page implemented by the integrated interfacing system for intelligent defect yield solutions in accordance with the present invention.

FIG. 3 shows a schematic diagram of a main page implemented by the integrated interfacing system for intelligent defect yield solutions in accordance with the present invention.

The above-mentioned dashboard summary module 202 is incorporated into the system for providing the various browseable items for serving users to review, preferably through the webpages initiated the web server. The dashboard summary module 202 in the exemplary example includes a low yield lot section 221 for reviewing the low-yield wafer lots. After the users click the item, the webpages are initiated to display the status of the low-yield lots since they are under a specific data mining process.

An R&D lot section 222 in the module 202 is provided for users to browse the wafer lots under developments. A pilot product section 223 is further included in the dashboard summary module 202 for providing users to browse the pilot products after the pilot product wafer are measured under different conditions. Furthermore, a combo chip lot section 224 is included in the module 202 for providing users to review the combo chip lots.

A search section 225 is particularly introduced in the interfacing system while the dashboard summary module 202 is initiated. The users may search the interested items through the function of the search section 225 which will perform a searching process going through the whole database.

Figure 4:
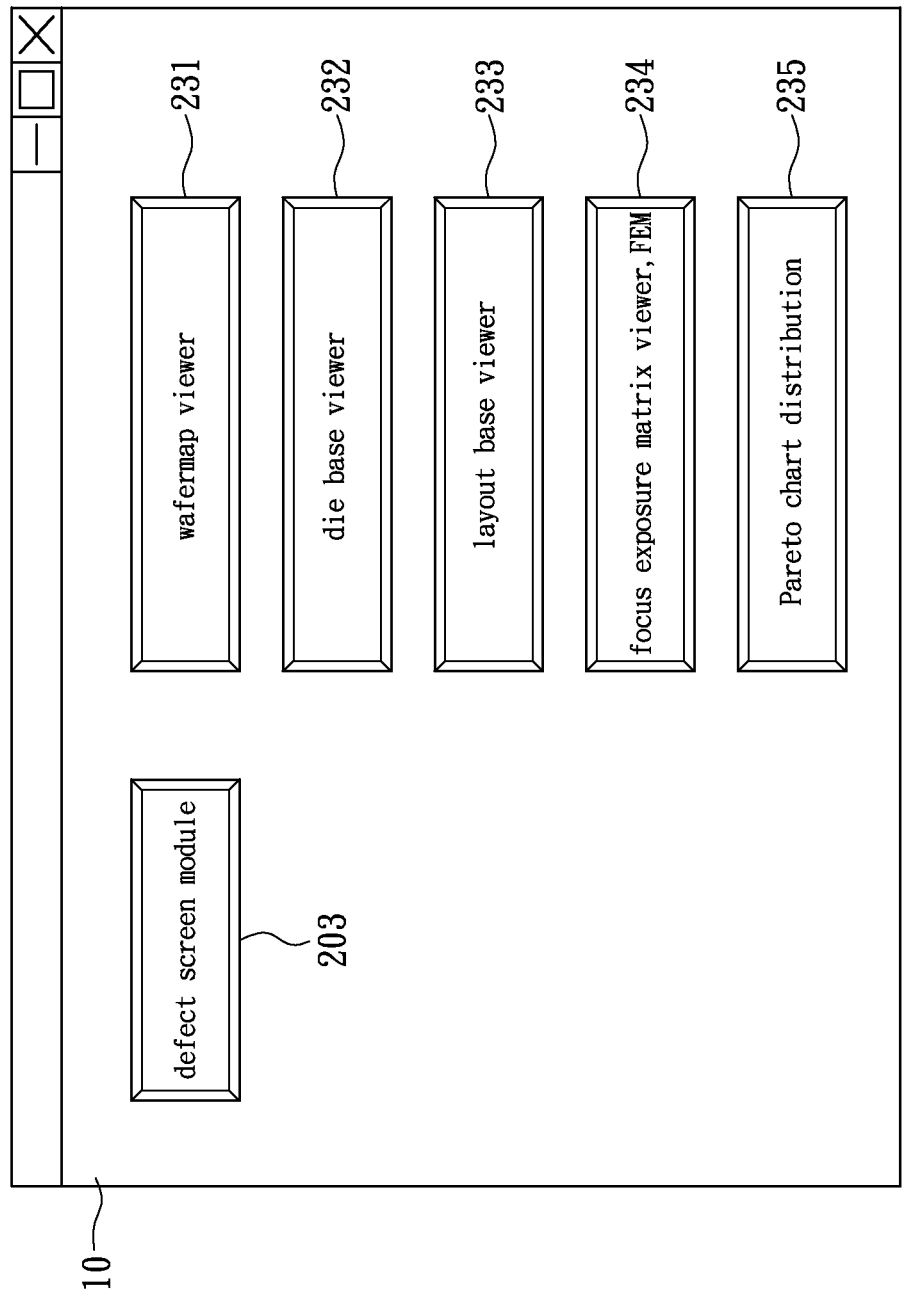
FIG. 4 shows a schematic diagram of web tools implemented by the integrated interfacing system for intelligent defect yield solutions in accordance with the present invention.

FIG. 4 then shows a schematic diagram of the defect screen module 203 initiated by the integrated interfacing system for intelligent defect yield solutions in accordance with the present invention.

The defect screen module 203 initiated by the web server of the interfacing system provides several viewers for users to view the layout pattern groups of the sampled wafers.

A wafermap viewer 231 is particularly provided for viewing a wafer map. In an instance, the semiconductor manufacturers have recently use a method in which binning coded equivalence (BCE) data are made about category grades of dies indicative of different characteristics of dies based on the result of some test results, and then mapped into the wafer map in accordance with a particular mapping format. The wafermap viewer 231 is made with a wafermap signature analysis for users to view the wafer map through the webpage initiated by the web server. The mentioned wafermap signature analysis is accomplished by referring a plurality of defect data from a focus exposure matrix (FEM), or a process window qualification (PWQ) test. In an exemplary embodiment, when the defect pattern is in different random size and randomly distributed in wafermap, a computer analysis method may be incorporated to performing the analysis of the defects as the random particle defect type.

A die base viewer 232 is also included in the defect screen module 203. The users are allowed to view the defects and layout distributed within a die from the scanned wafer defect data through the web interface created by the die base viewer 232. The users are also allowed to view the layout after design through the web interface generated by a layout base viewer 233 of the module 203.

Further, a focus exposure matrix (FEM) viewer 234 is provided for users to view the FEM. In conventional technology, for example, the focus exposure matrix is introduced for CD-SEM (scanning electron microscope) measurement which is taken for a set of printed predetermined structure with multiple defocus and dose conditions.

A Pareto chart distribution 235 in this defect screen module 203 is further provided for users to view a Pareto distribution diagram. This Pareto chart diagram is a type of vertical bar graph in which values are plotted for analyzing the existed problems. The Pareto chart distribution allows the users clearly viewing the point-to-point graph showing the greatest cumulative effect on a given system.

Figure 5:
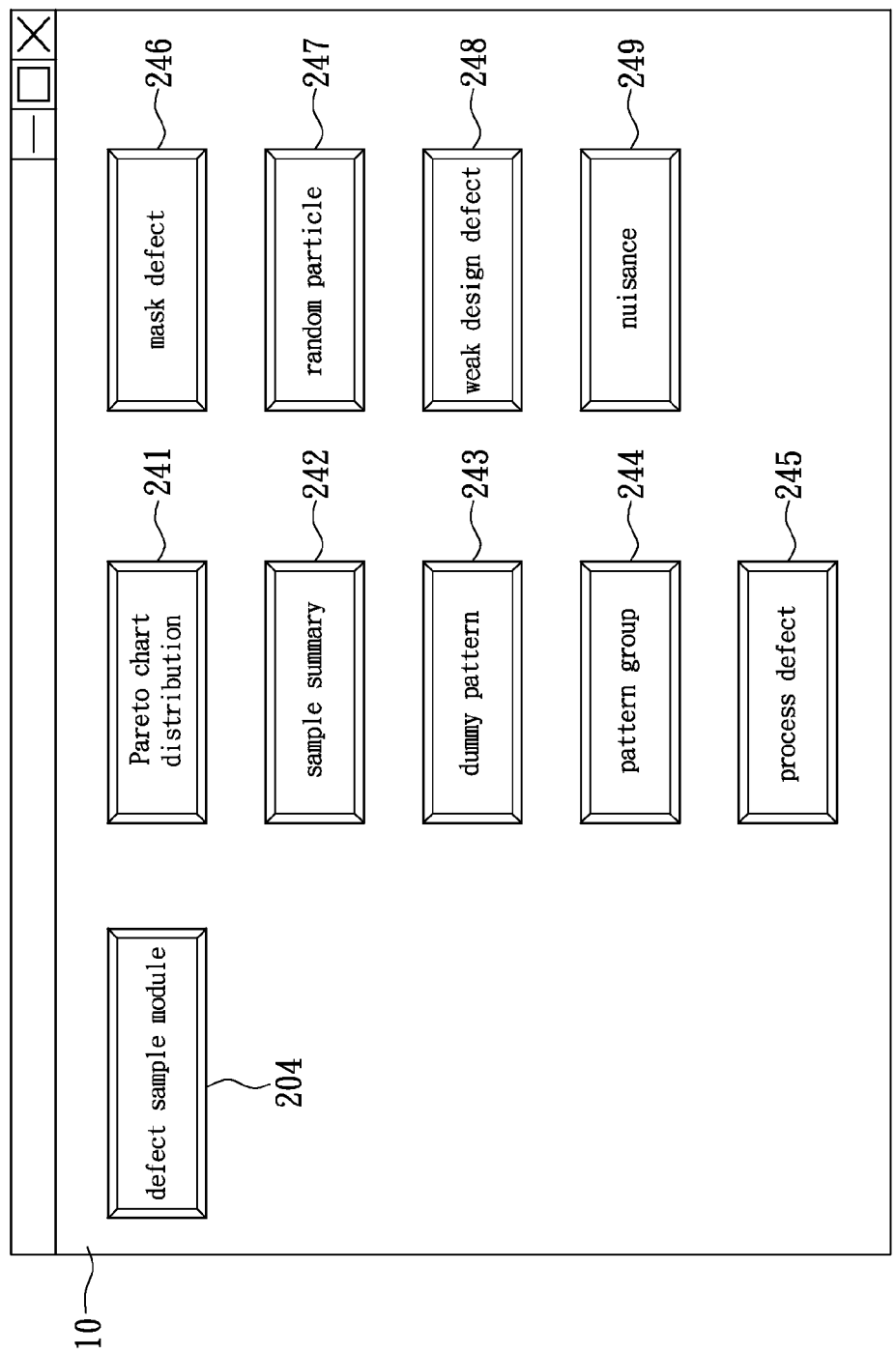
FIG. 5 shows a schematic diagram of web tools implemented by the integrated interfacing system for intelligent defect yield solutions in accordance with second embodiment of the present invention.

FIG. 5 then shows a web tool of the defect sample module 204 in accordance with second embodiment of the present invention.

The defect sample module 204 is provided by the web server for users to view the Pareto chart distribution 241, the sample summary 242, the dummy pattern 243, the pattern group 244, the process defect 245, the mask defect 246, the random particle 247, the weak design defect 248, and the other nuisance 249.

The interfacing system of the present invention uses the input images to be analyzed. The defect sample module 204 assists users in viewing the samples, such as their Pareto chart distribution indicative of cumulative effect, sample summary, the filtered dummy pattern, pattern group indicative of the potential systematic defect pattern, process defect, mask defect, random particles, weak design defects or others.

Figure 6:
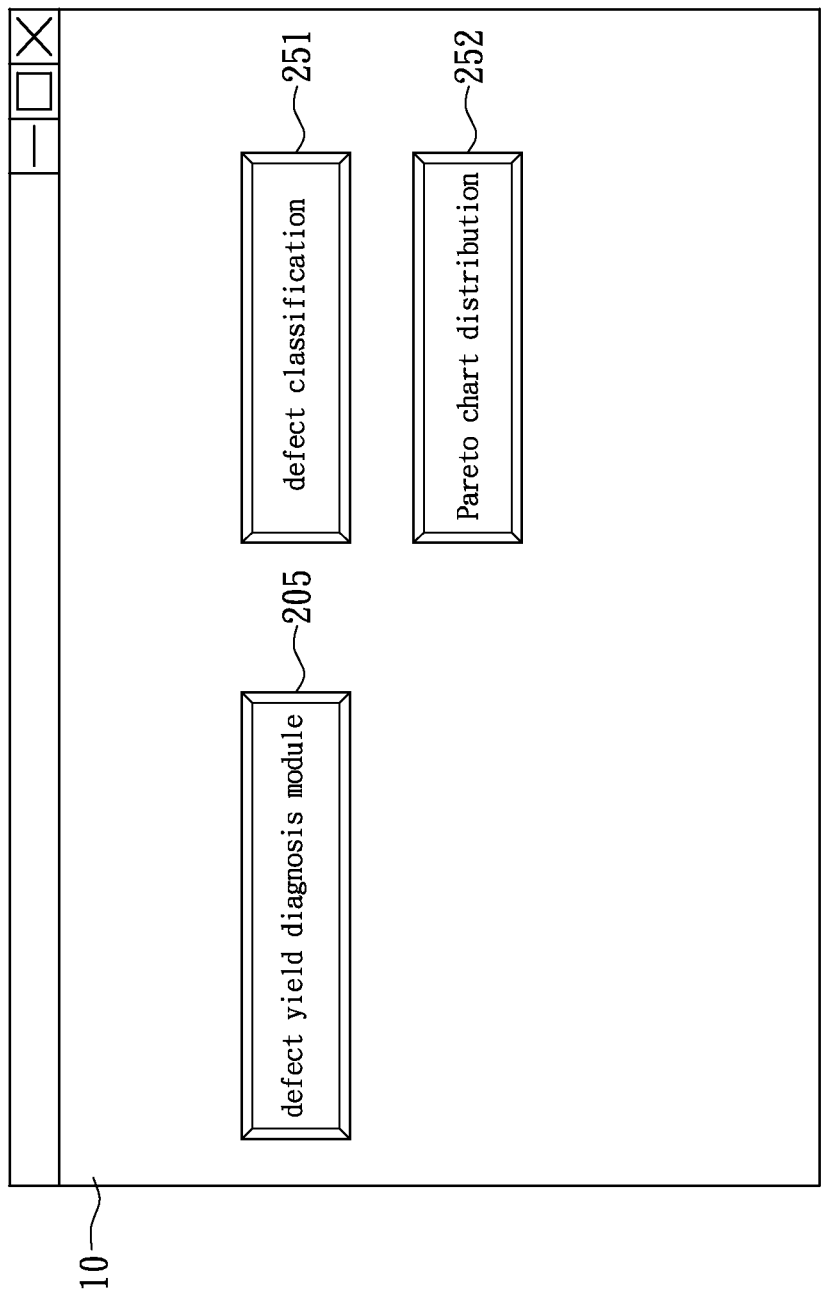
FIG. 6 shows a schematic diagram of web tools implemented by the integrated interfacing system for intelligent defect yield solutions in accordance with third embodiment of the present invention.

FIG. 6 further shows a schematic diagram of the defect yield diagnosis module 205. This defect yield diagnosis module 205 provides the tools for users to view the defect classification 251 and Pareto chart distribution 252 of the defects, especially through the web interface initiated by the web server. The defect classification 251 and Pareto chart distribution 252 are exemplarily the program-enabled buttons shown on the web page for users to click to activate the viewing functions.

Figure 7:
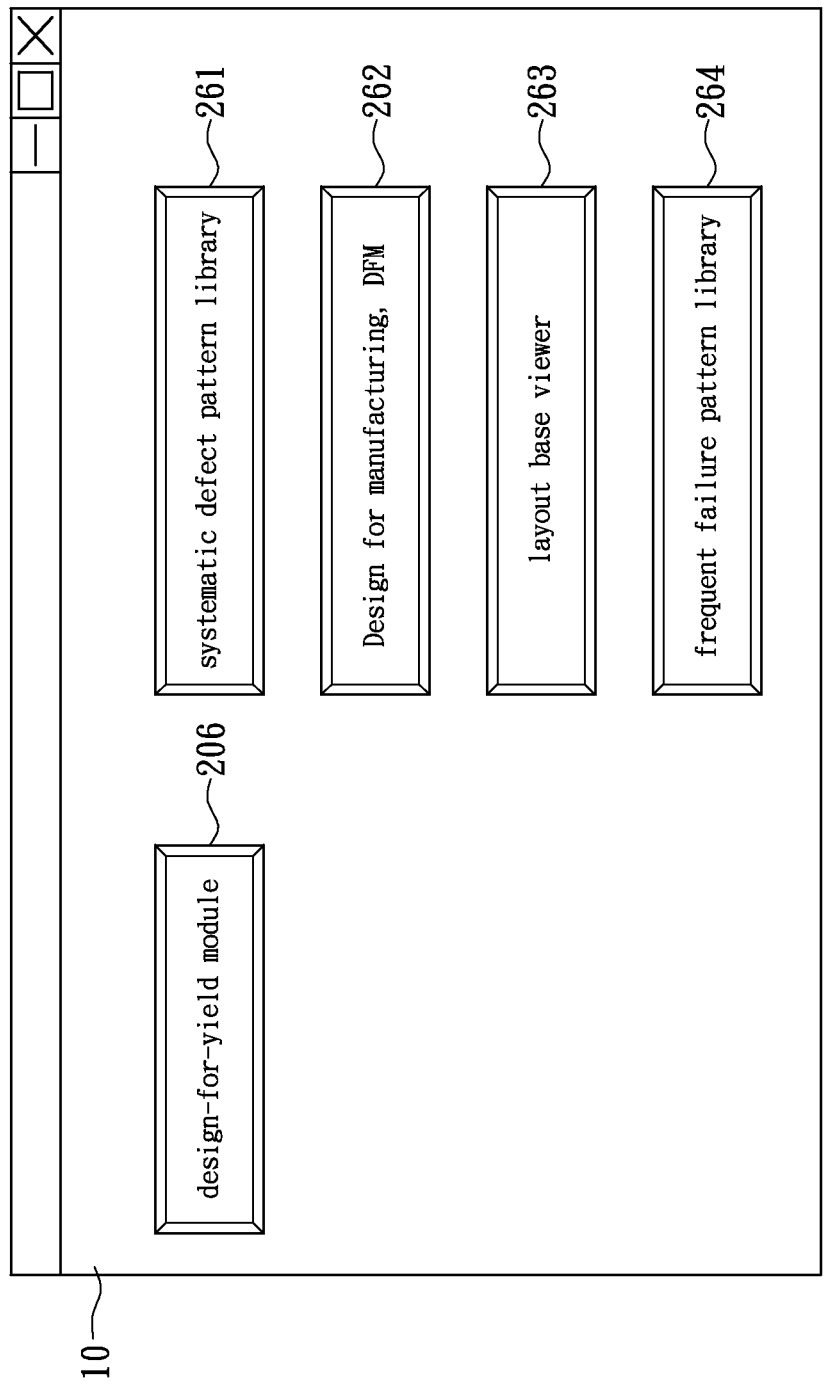
FIG. 7 shows a schematic diagram of web tools implemented by the integrated interfacing system for intelligent defect yield solutions in accordance with fourth embodiment of the present invention.

FIG. 7 shows a schematic diagram of the design-for-yield module 206 implementing a web tool for users to view the information. A systematic defect pattern library 261 and frequent failure defect pattern library are provided for users to check the systematic defect patterns, which are predetermined by the earlier stage processes. The mentioned frequent failure defect pattern is exemplarily made by the cumulative lots analysis and layout-based pattern group which indicates the systematic defect pattern. The frequent failure defect pattern effectively shortens the yield learning curve.

A goal of design for manufacturing (DFM) is to consider manufacturing constraints at various stages of design. A viewer for Design for manufacturing (DFM) 262 is provided for users to view the defected design hot spot layout of the integrated circuits.

A layout base viewer 263 is provided for viewing the layout of the wafer design. The frequent failure defect pattern library 264 is for users to view the collected frequent occurred defect failure patterns from mass cumulative production lots using layout based defect pattern group analysis.

Figure 8:
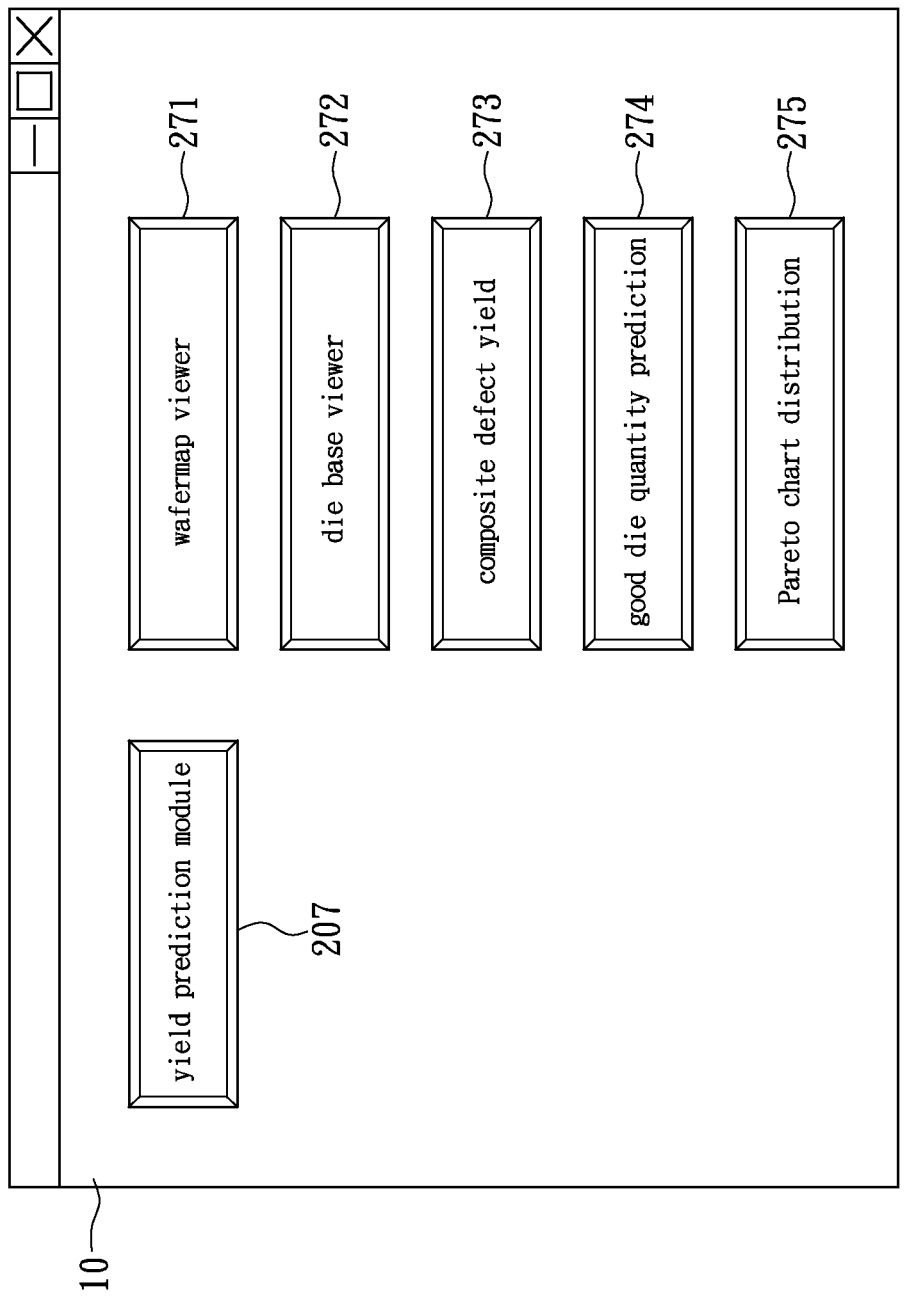
FIG. 8 shows a schematic diagram of web tools implemented by the integrated interfacing system for intelligent defect yield solutions in accordance with fifth embodiment of the present invention.

FIG. 8 shows a schematic diagram of the yield prediction module 207 initiated by the web server. Through the web interface, the yield prediction module 207 initiates some tools for users to view the wafer map, die, composite defect yield, good die prediction, and the Pareto chart distribution.

A wafermap viewer 271 in the module 207 is for uses to view the wafer map. Through the wafer map, the users may find the malfunction of the related equipment from the unusual wafermap.

A die base viewer 272 is also provided for users to check the defects and layout distributed within a die from the scanned defect data. A composite defect yield 273 is an item for users to click to check the composite defect yield. Since the fabrication plant performs a composite defect yield analysis by means of defect yield diagnosis, the composite wafer defects will be shown up when the data of wafer defects are stacked. This composite defect yield 273 is a tool assisting users to view the yield related to the composite defects.

A good die quantity prediction 274 is then provided for users to check the quantity prediction of the good dies after the interfacing system performs the diagnosis over the input wafer images. After that, a Pareto chart distribution 275 preparing for clearly viewing the greatest cumulative effect on a given system is provided.

Figure 9:
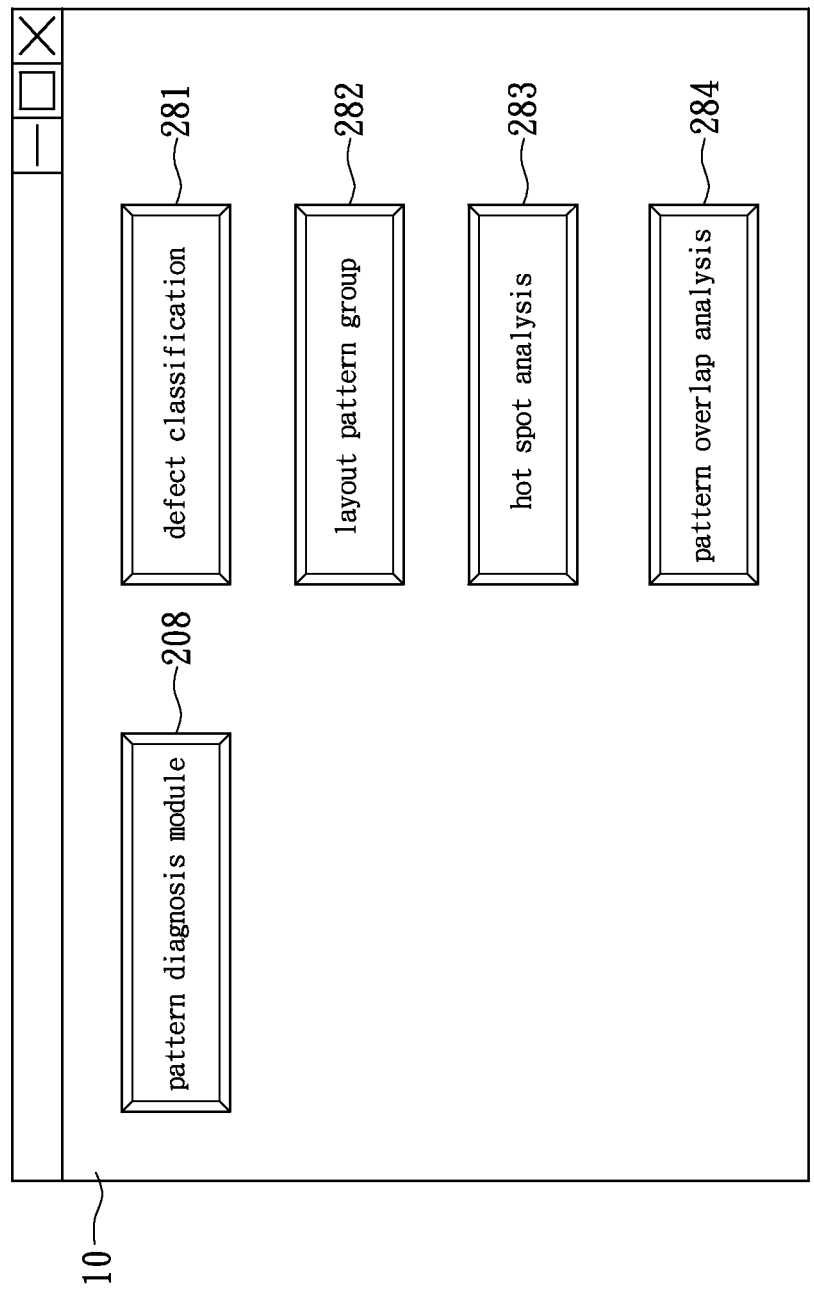
FIG. 9 shows a schematic diagram of web tools implemented by the integrated interfacing system for intelligent defect yield solutions in accordance with sixth embodiment of the present invention.

FIG. 9 shows a schematic diagram of the pattern diagnosis module 208 which is a tool initiated by the web server for users to overview the pattern contour dimension by several functionalities. In which, a pattern contour reviewing defect classification mode 281 is provided for users to view the pattern contour dimension of the various defect classification modes. When users click the icon representing this tool, a table may be shown up to list the pattern contour for review and measure in defect classification mode.

A layout pattern group 282 is also provided for viewing the layout pattern of the sampled wafers. A design layout includes a plurality of layout patterns which have their individual features. The predetermined layout patterns represented by the various image formats are provided for matching with the input wafers. After the constant analyses, the layout patterns can be updated. The computer-enabled device may perform the pattern match between a plurality of new design layout patterns and the layout patterns in a defect pattern library, for example, the systematic defect pattern library 261.

As semiconductor fabrication technologies are continually progressing to smaller sizes of production, scaling-down designs at the larger-sized wafer often result in hot spots or problem areas in the device. Examples of hot spots include pinching, bridging, dishing, erosion, RC delay, metal line thickness variations, Cu residue, and other characteristics that affect the desired device performance. A viewing tool for hot spot analysis 283 initiated by the web server is functioned to perform a hot-spot analysis through pattern contour metrology and hot spot rule, so as to detect the hot spots pattern over the wafers. The hot spots patterns may be referred to the diagram shown in FIG. 40.

Since the same layout based pattern groups may be overlapped during the fabrication, the patterns can be mapped. A pattern overlap analysis 284 in the pattern diagnosis module 208 is provided for activating the analysis of the overlapped patterns that comprise design layout pattern and multiple SEM image pattern contours.

Figure 10:
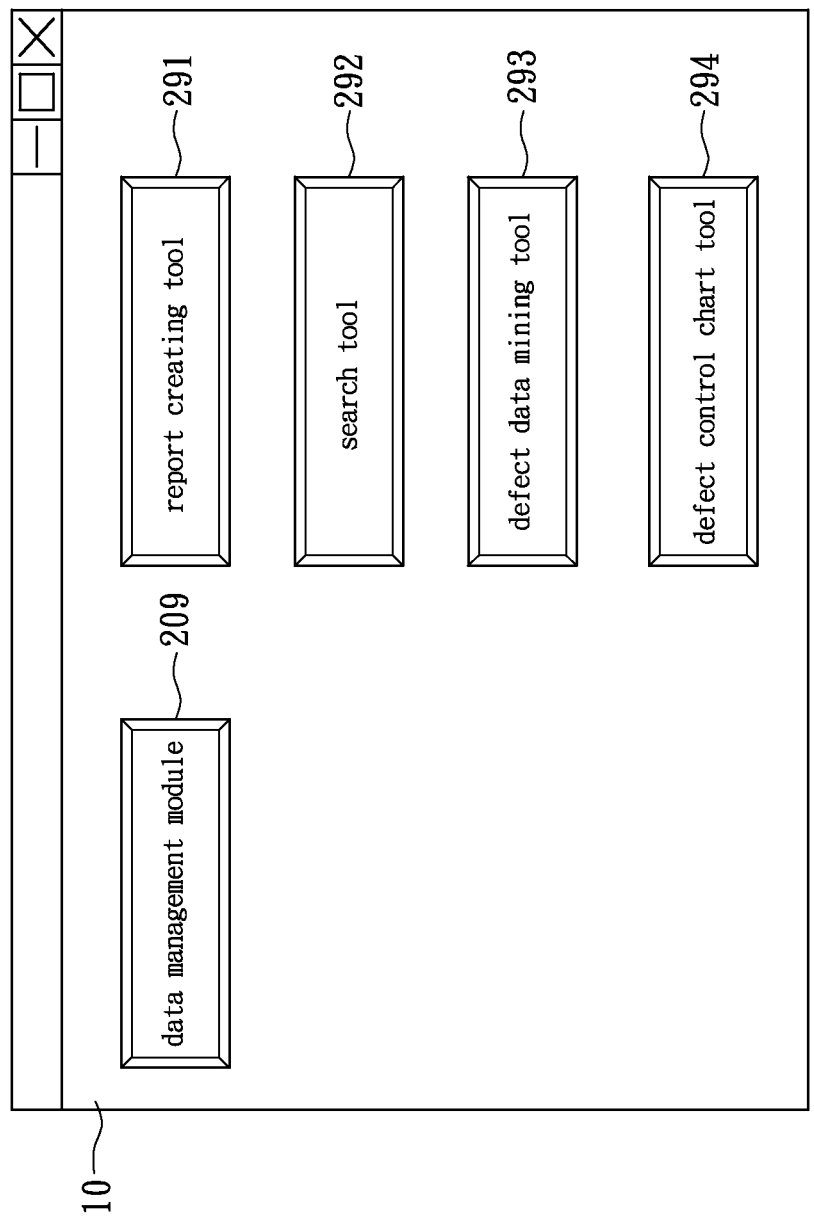
FIG. 10 shows a schematic diagram of web tools implemented by the integrated interfacing system for intelligent defect yield solutions in accordance with seventh embodiment of the present invention.

In FIG. 10, a web tool "data management module 209" is introduced for the system to manage the data collected from the input defect data and images, the analysis, and the output. The data management module 209 particularly includes a report creating tool 291 for creating the report according to the results made by the above-described tools. A search tool 292 in the data management module 209 is included for searching the data report in the system. A defect data mining tool 293 is activated by the users' operation for performing data mining regarding the defects in the above described issues. A defect control chart tool 294 is used to provide an overlook over the wafer defects undergoing the above mentioned procedures.

Figure 11:
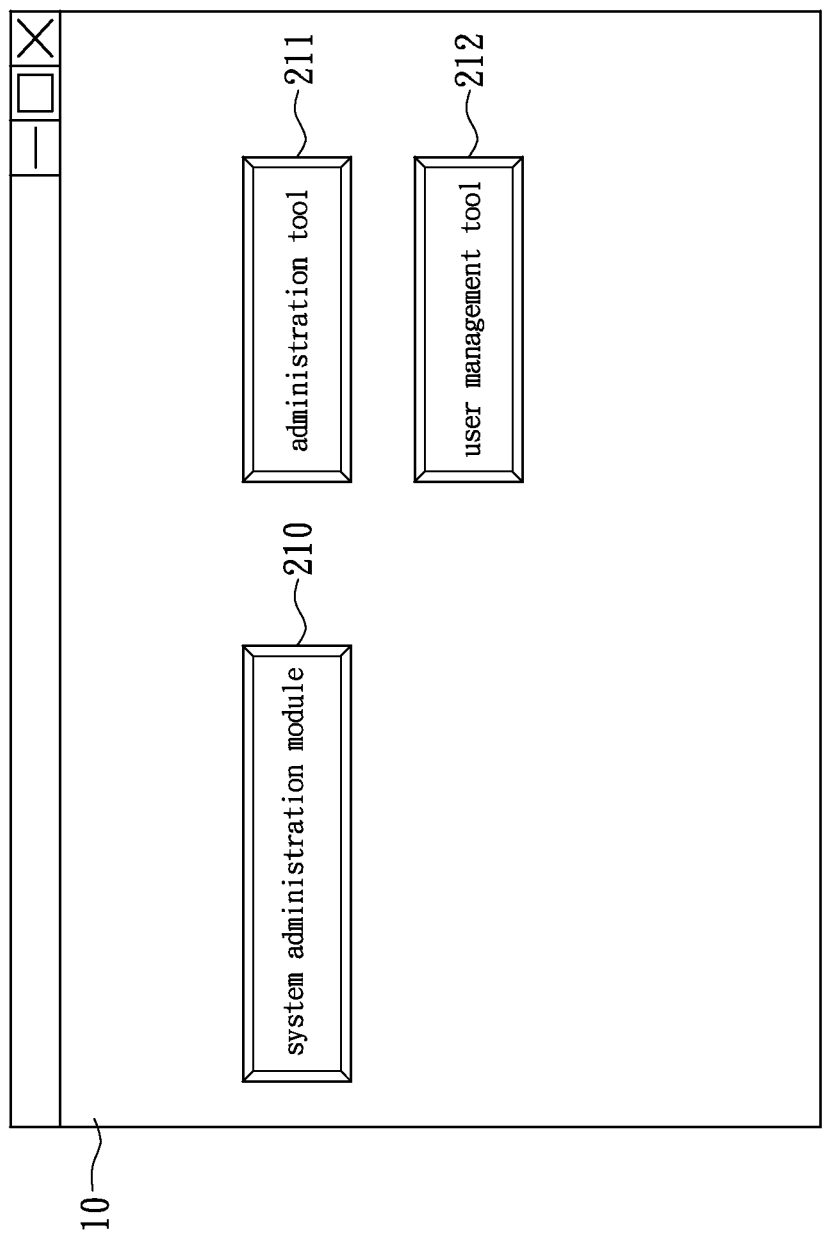
FIG. 11 shows a schematic diagram of web tools implemented by the integrated interfacing system for intelligent defect yield solutions in accordance with eighth embodiment of the present invention.

FIG. 11 shows a system administration module 210 for the interfacing system. The system administration module 210 includes an administration tool 211 for system. The administration tool 211 is preferably a web-enabled tool for users to operate through the web interface. A user management tool 212 is provided for managing the user data.

Figure 12:
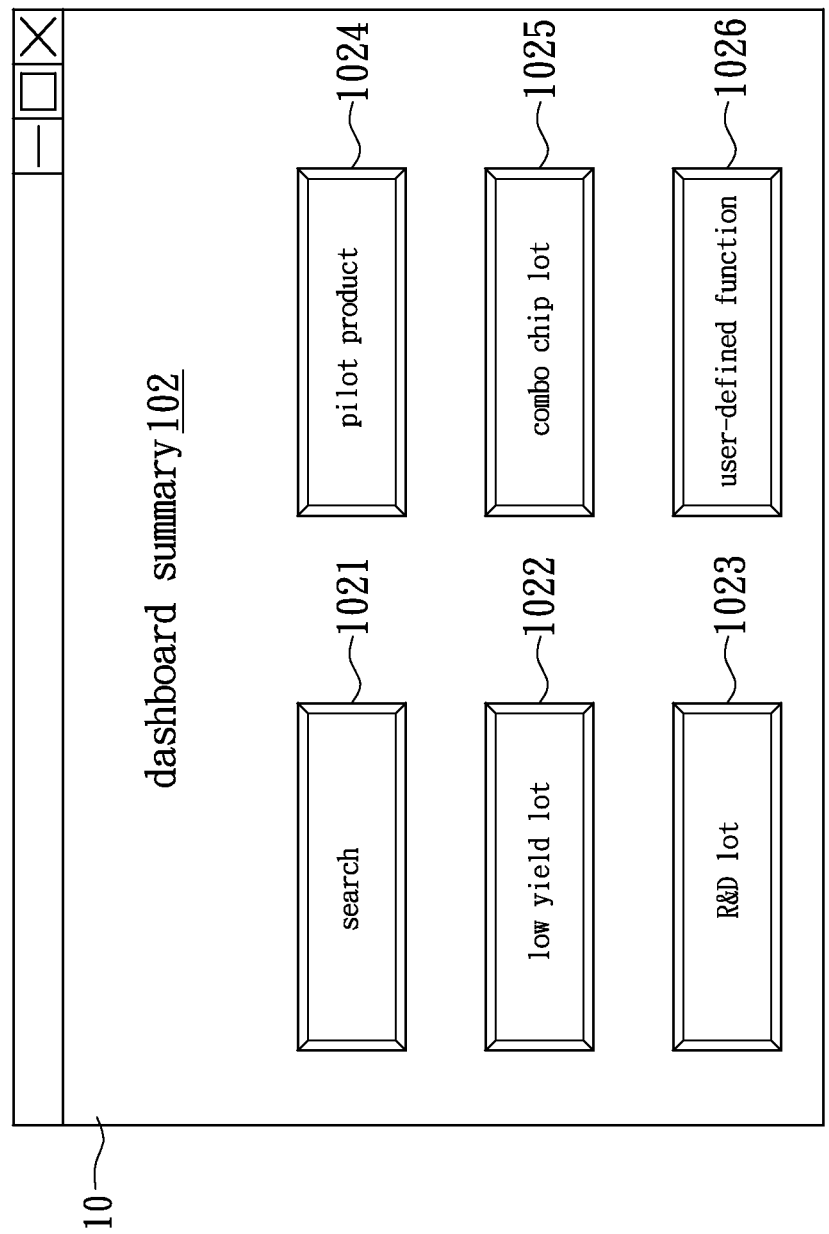
FIG. 12 shows a schematic diagram of a summary page implemented by the integrated interfacing system for intelligent defect yield solutions in accordance with the present invention.

A web page showing the dashboard summary 102, as shown in FIG. 12. This summary page implemented by the integrated interfacing system for intelligent defect yield solutions is also a web-enabled tool.

The summary 102 in response to the users' operation shows the low yield lot 1022 based on the analysis, the R&D lot 1023, the pilot product 1024, the combo chip lot 1025, and the provision of user-defined function 1026. A search function 1021 is also provided for users to input the keywords to conduct the searching.

Figure 13:
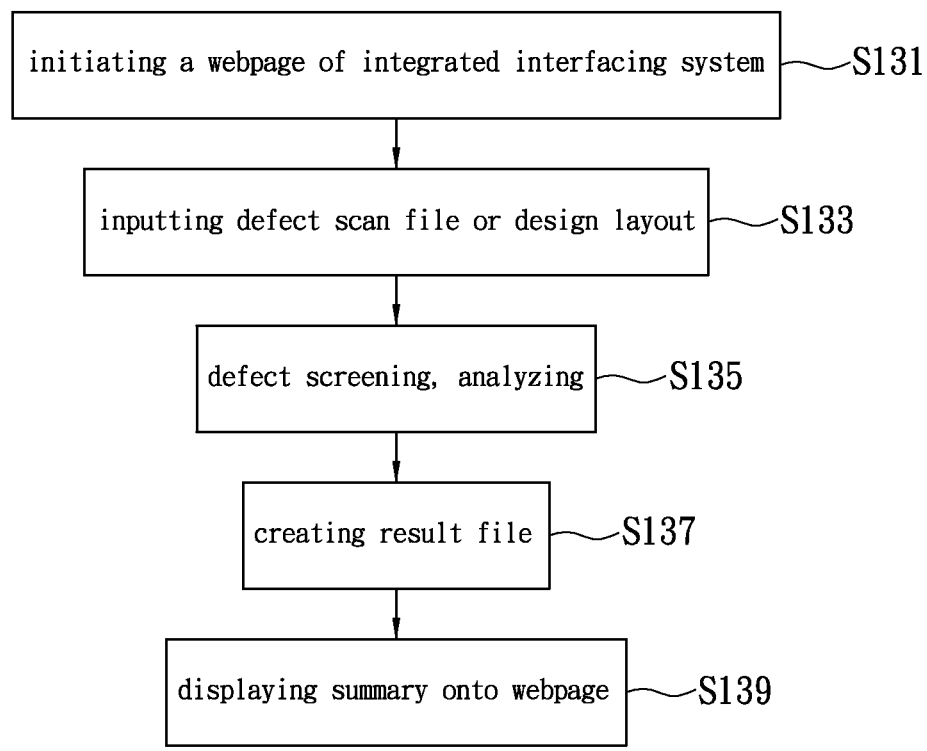
FIG. 13 is a flow chart illustrating displaying lots in the integrated interfacing system in accordance with the present invention.

When the dashboard summary is required to be made, a process is conducted to generate the summary page. A flow chart illustrating displaying lots in the integrated interfacing system is described in FIG. 13.

In the beginning step S131, the web server initiates a webpage of integrated interfacing system. The initiation will generate one or more web pages for users to operate. Since the system requires the input of data, such as step S133, the defect scan file or design layout generated at the very beginning steps is inputted. In step S135, the web server will initiate the tools to perform defect screening and analyzing. The relevant results are then created (step S137). A summary related to the results is displayed onto the webpage (step S139), such as shown as the dashboard summary (102) of FIG. 12.

Figure 14:
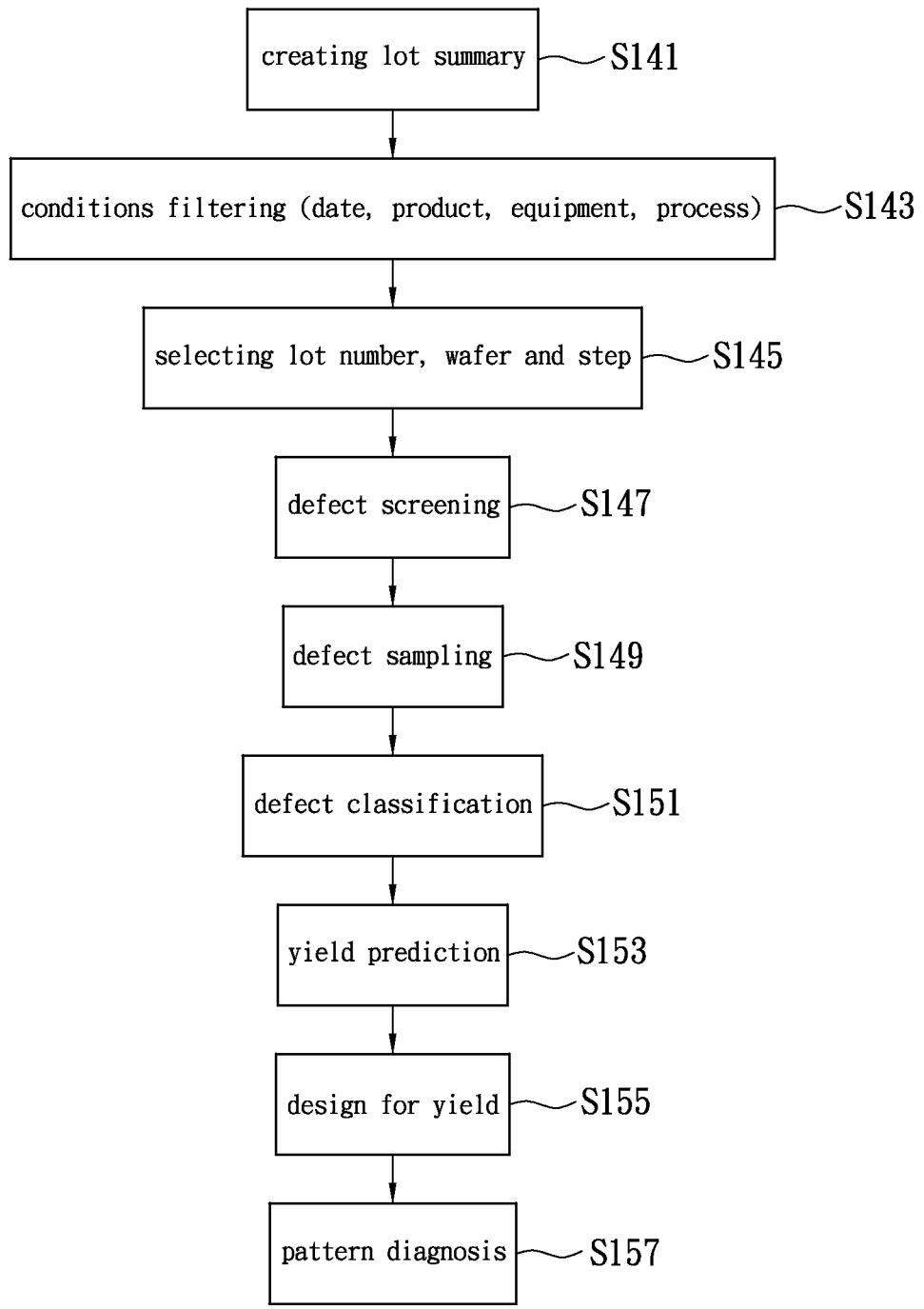
FIG. 14 is a flow chart illustrating defects processing in the integrated interfacing system in accordance with the present invention.

FIG. 14 is a flow chart illustrating defects processing in the integrated interfacing system in accordance with the present invention.

Step S141 shows the interfacing system creates lot summary based on the input data. The data is undergoing the several preliminary filtering conditions, including date, product, equipment, and process (step S143). The data is then categorized. Through the web interface, the system provides the tools for users to make selection, such as step S145, the users may select the lot number, wafer and step as required. Most functionalities corresponding to the selections have been described in the above description.

Those selections cause the interfacing system to perform the corresponding operations, including defect screening (step S147), defect sampling (S149), defect classification (step S151), yield prediction (step S153), design for yield (step S155), and pattern diagnosis (step S157).

After the defect screening step performed onto the wafer defect images (step S147) shown in FIG. 14, the web server of the interfacing system then initiates a summary page to display a defect screen summary.

Figure 15:
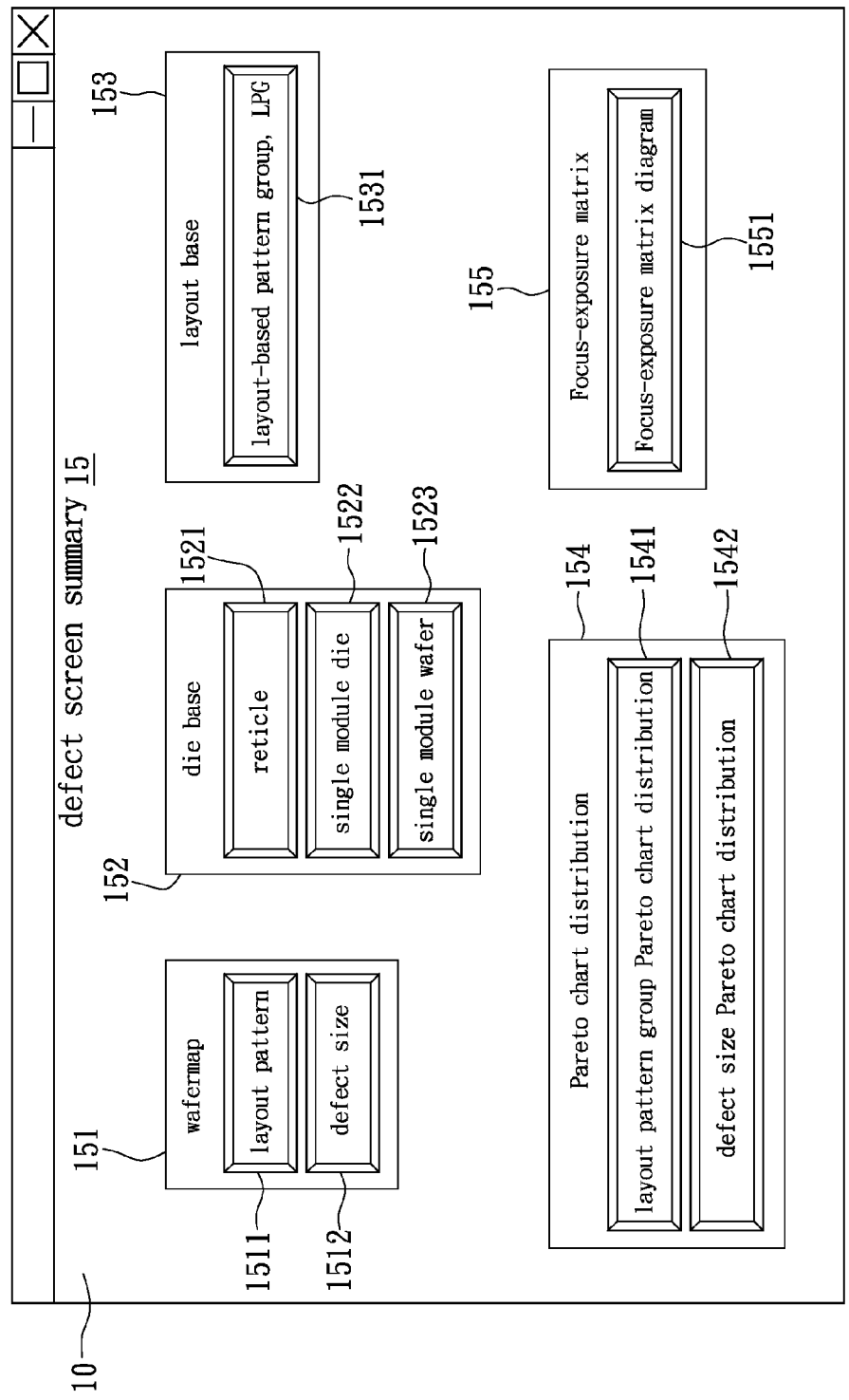
FIG. 15 shows a schematic diagram of a defect screen summary page implemented by the integrated interfacing system for intelligent defect yield solutions in accordance with the present invention.

FIG. 15 shows a schematic diagram of a defect screen summary page implemented by the integrated interfacing system for intelligent defect yield solutions. The defect screen summary 15 including wafermap 151, die base 152, layout base 153, pattern group summary, Pareto chart distribution 154, and Focus-exposure matrix 155 is exemplarily shown.

The function of wafermap 151 including the pattern group summary, in response to the users' operation, may show up the layout pattern 1511 and the defect size 1512 after a series of instructions executing the wafermap signature analysis accomplished by referring to a plurality of defect data from the FEM or PWQ test.

After diagnosis process of the defect data, the die base 152 including the pattern group summary may be shown up with reticle 1521, single module die 1522, single module wafer 1523, and the pattern groups. The layout base 153 may also be shown with a layout-based pattern group (LPG) 1531.

The Pareto chart distribution 154 may be applied to show a layout pattern group Pareto chart distribution 1541 and a defect size Pareto chart distribution 1542. The Focus-exposure matrix 155 is also shown accompanied with a Focus-exposure matrix diagram 1551.

Figure 16:
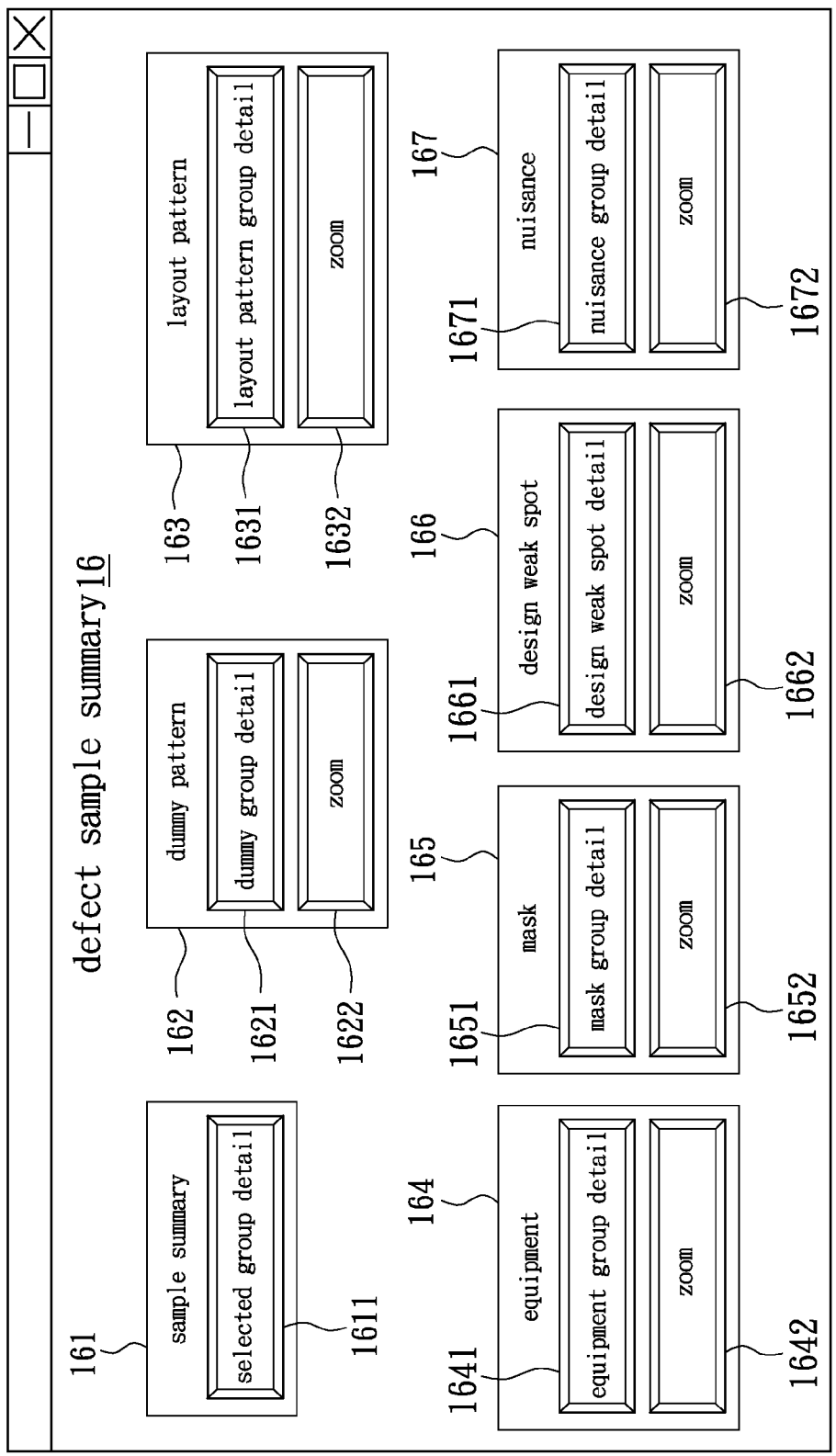
FIG. 16 shows a schematic diagram of a defect sample summary page implemented by the integrated interfacing system for intelligent defect yield solutions in accordance with the present invention.

FIG. 16 shows a schematic diagram of a defect sample summary page implemented by the integrated interfacing system for intelligent defect yield solutions.

The defect sample summary 16 provides several icons for users to select for viewing, the defect sample selection includes estimating the killer defect index of each layout based defect composite pattern group.

The defect sample summary 16 primarily includes a sample summary 161 having the selected group detail 1611, a dummy pattern 162 provided to view the dummy group detail 1621 and conduct zooming 1622, and a layout pattern 163 provided for viewing the layout pattern group detail 1631 and conducting zooming 1632.

The defect sample summary 16 also provides the functions to view an equipment 164 with the equipment group detail 1641 and view by zooming 1642, a mask 165 with mask group detail 1651 and view by zooming 1652, a design weak spot 166 with the design weak spot detail 1661 and view by zooming 1662, and the nuisance 167 with its group detail 1671 and by zooming 1672.

Figure 17:
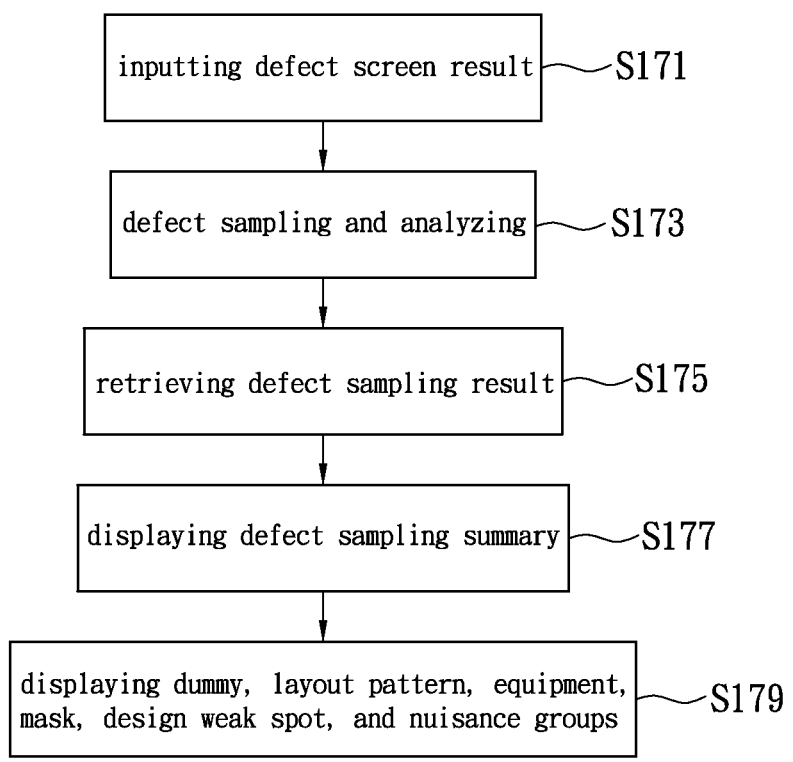
FIG. 17 is a flow chart illustrating defects sampling in the integrated interfacing system in accordance with the present invention.

FIG. 17 is a flow chart illustrating defects sampling in the integrated interfacing system in accordance with the present invention. The defect sample summary (16) of FIG. 16 is exemplarily generated through the following steps.

In step S171, the defect screen result is inputted into the interfacing system. Then the method initiated by the system goes to perform defect sampling and analyzing (step S173). The step S175 in the method is then to retrieve the defect sampling result, and display the defect sampling summary (step S177). The next step S179 shows that the method goes to display the dummy, layout pattern, equipment, mask, design weak spot, and nuisance groups onto the web page initiated by the web server.

Figure 18:
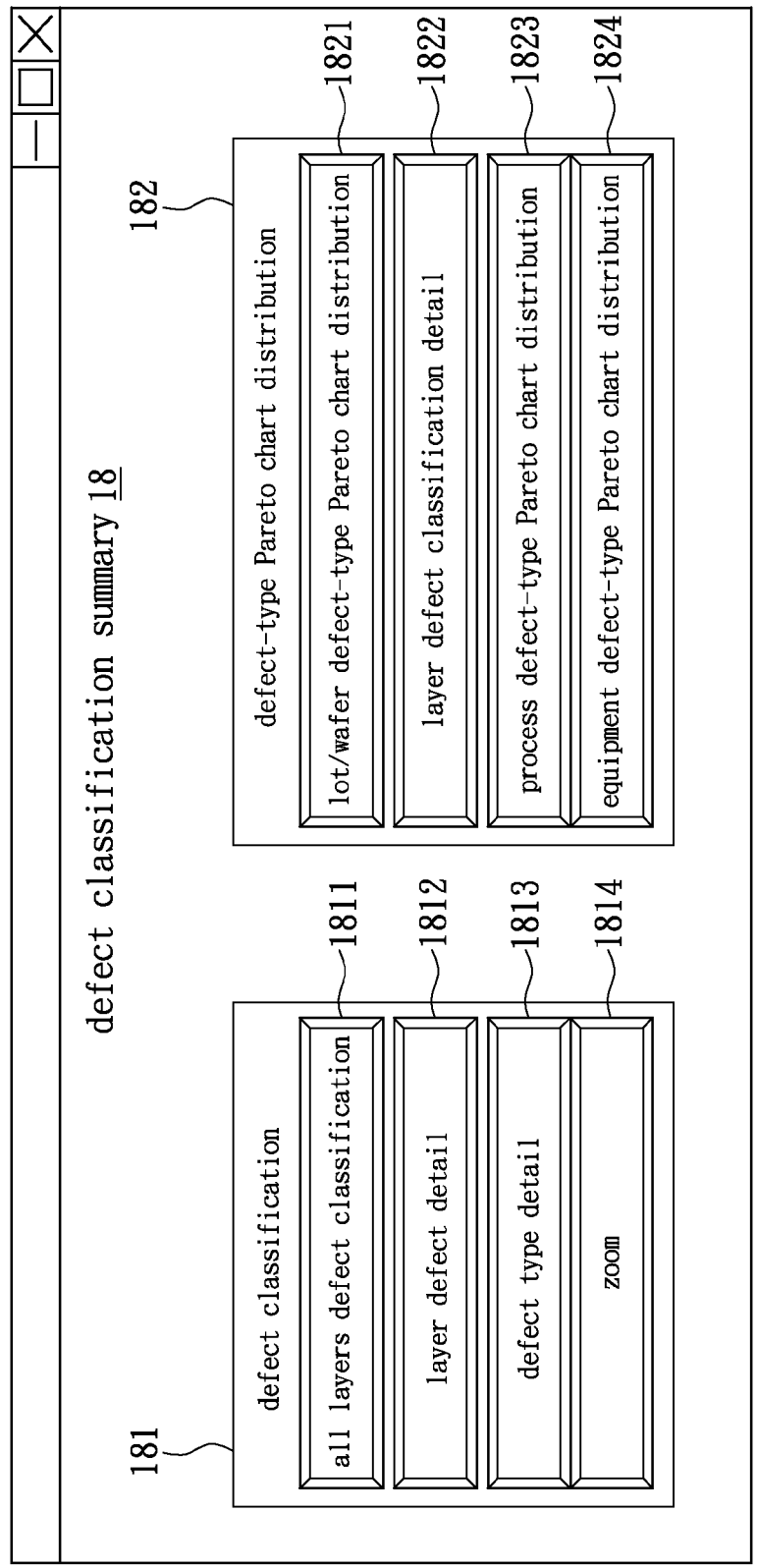
FIG. 18 shows a schematic diagram of a defect classification summary page implemented by the integrated interfacing system for intelligent defect yield solutions in accordance with the present invention.

FIG. 18 shows a schematic diagram of a defect classification summary page implemented by the integrated interfacing system for intelligent defect yield solutions. A defect classification summary 18 is generated onto the web page by the interfacing system, and on which a defect classification 181, and a defect-type Pareto chart distribution 182 are included.

The defect classification 181 shows up the results undergoing some classification processes. The defect classification 181 is an item initiated by the web server. When the item "defect classification 181" is clicked over the webpage, an all layers defect classification 1811, a layer defect detail 1812, a defect type detail 1813, and a zooming function 1814 can be conducted in response to the selection made by the user.

The defect-type Pareto chart distribution 182 is also an item initiated by the web server. When the item "defect-type Pareto chart distribution 182" is initiated, the system provides the information including a lot/wafer defect-type Pareto chart distribution 1821, a layer defect classification detail 1822, a process defect-type Pareto chart distribution 1823, and an equipment defect-type Pareto chart distribution 1824 through a web page initiated by the web server.

Figure 19:
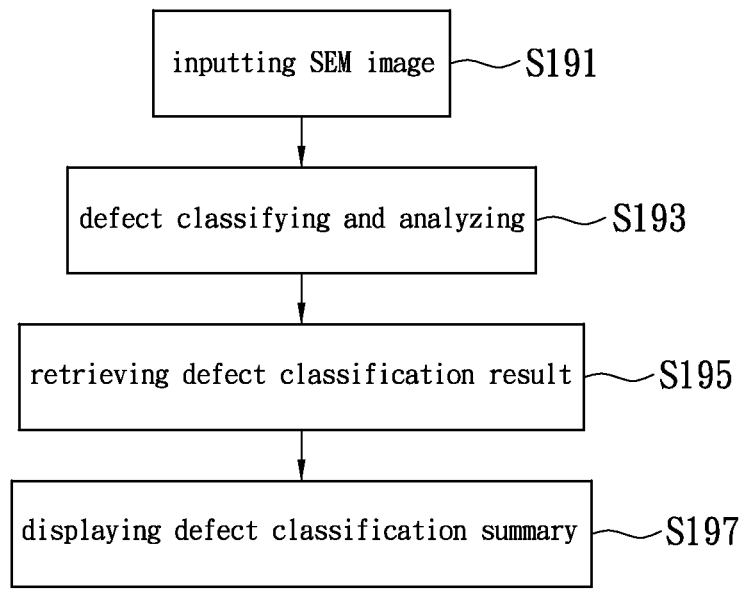
FIG. 19 is a flow chart illustrating defects browsing in the integrated interfacing system in accordance with the present invention.

FIG. 19 then shows a flow chart illustrating defects browsing in the integrated interfacing system.

In step S191, the defect images such as SEM images or the like are inputted into the interfacing system. Those images are undergoing defect classifying and analyzing processes (step S193), and the system retrieves defect classification result (step S195). Finally, the web server initiates a web page to display the defect classification summary (step S197).

Figure 20:
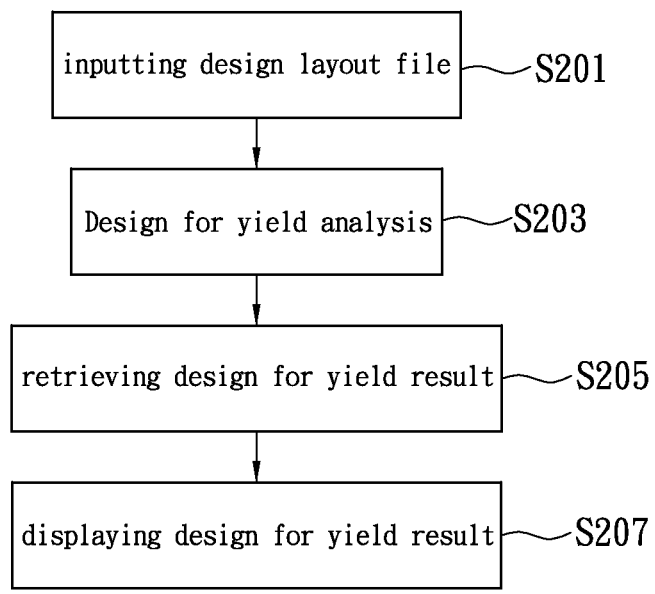
FIG. 20 is a flow chart illustrating yield in the integrated interfacing system in accordance with the present invention.

FIG. 20 shows a flow chart illustrating yield in the integrated interfacing system. In the first step S201, one or more design layout files are inputted into the interfacing system. The system then performs design for yield analysis (step S203), and retrieves the results made by the design for yield process (step S205). Then the web server initiates a web page to display the results of design for yield (step S207).

Figure 21:
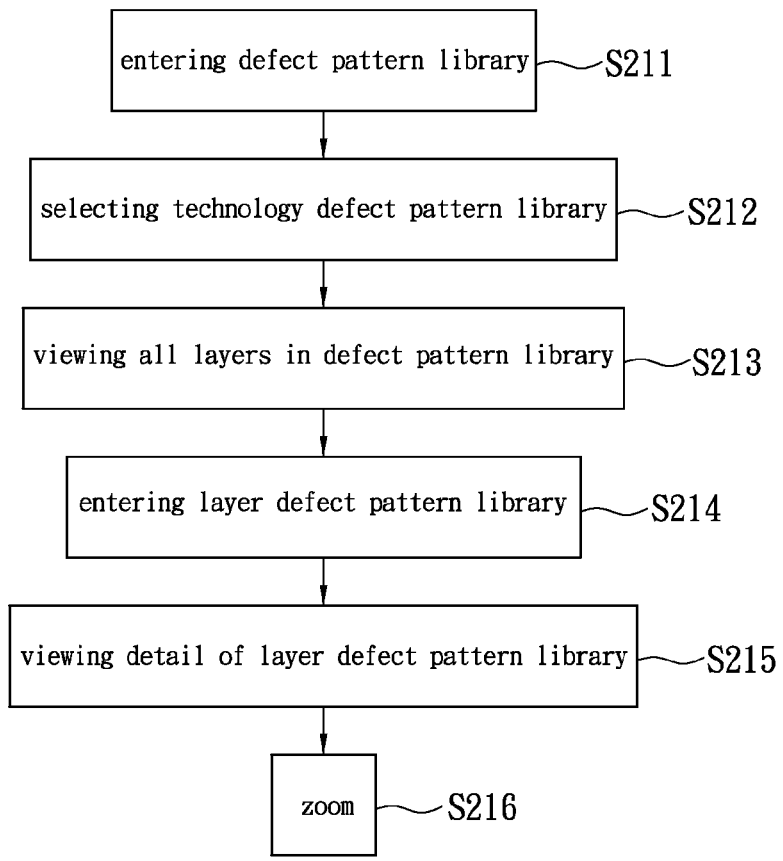
FIG. 21 is a flow chart illustrating defect viewing in the integrated interfacing system in accordance with the present invention.

The users may use the web interface initiated by the web server to review the various defect pattern libraries. FIG. 21 shows a flow chart illustrating defect viewing in the integrated interfacing system in accordance with the present invention. When the user enters a defect pattern library as clicking the icon configured to execute the instructions of initiating the process for web browsing (step S211), he may select a technology defect pattern library (step S212). Then all layers in defect pattern library are provided to be viewed (step S213). After that, the user may enter layer defect pattern library (step S214) as clicking the icon configured to initiate the related process, and view the detail of layer defect pattern library (step S215). The tool also provides zooming function for the user (step S216).

Figure 22:
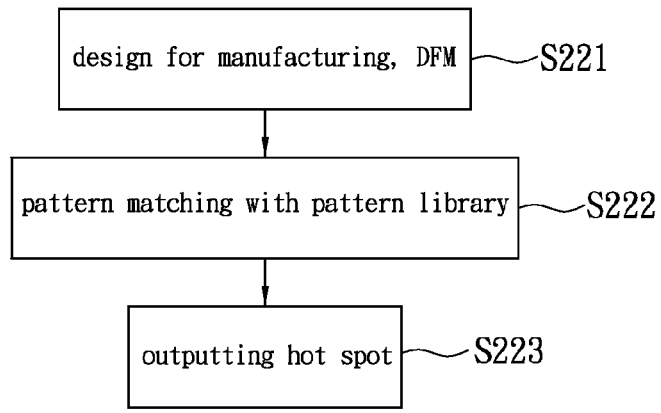
FIG. 22 is a flow chart illustrating pattern matching in the integrated interfacing system in accordance with the present invention.

FIG. 22 shows a flow chart illustrating pattern matching in the integrated interfacing system. The flow includes a step S221 for executing design for manufacturing (DFM) and applying the pattern matching with defect pattern library (step S222). Through the web page initiated by the web server, the hot spot pattern can be outputted (step S223) under a hot spot analysis.

Figure 23:
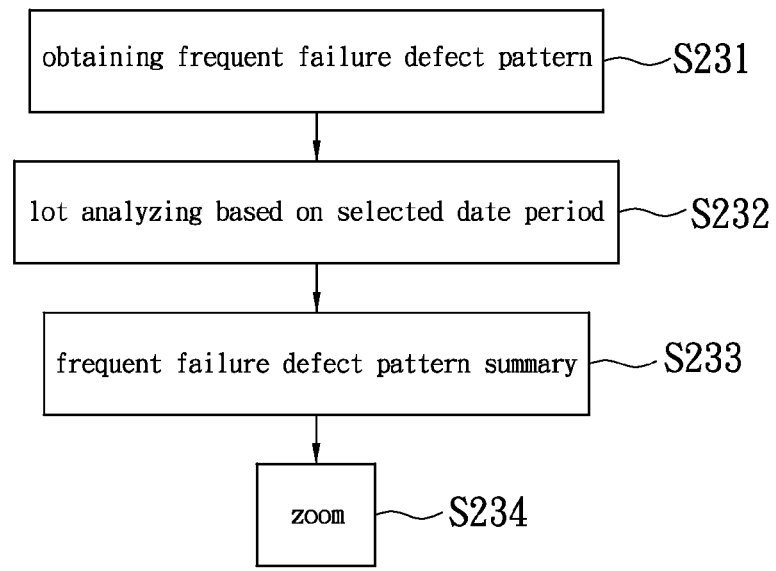
FIG. 23 is a flow chart illustrating displaying frequent failure defect pattern in the integrated interfacing system in accordance with the present invention.

The web server also initiates the pages to show the frequent failure defect pattern by summing up the defect patterns. The steps of displaying frequent failure defect pattern are shown as a flow chart of FIG. 23.

In step S231, the system obtains the frequent failure defect pattern(s) from the previous analysis. In response to the users' operation through the web interface, the system performs lot analyzing based on the users' selected date period (step S232). A frequent failure defect pattern summary is formed (step S233), and able to be zoomed for viewing (step S234).

Figure 24:
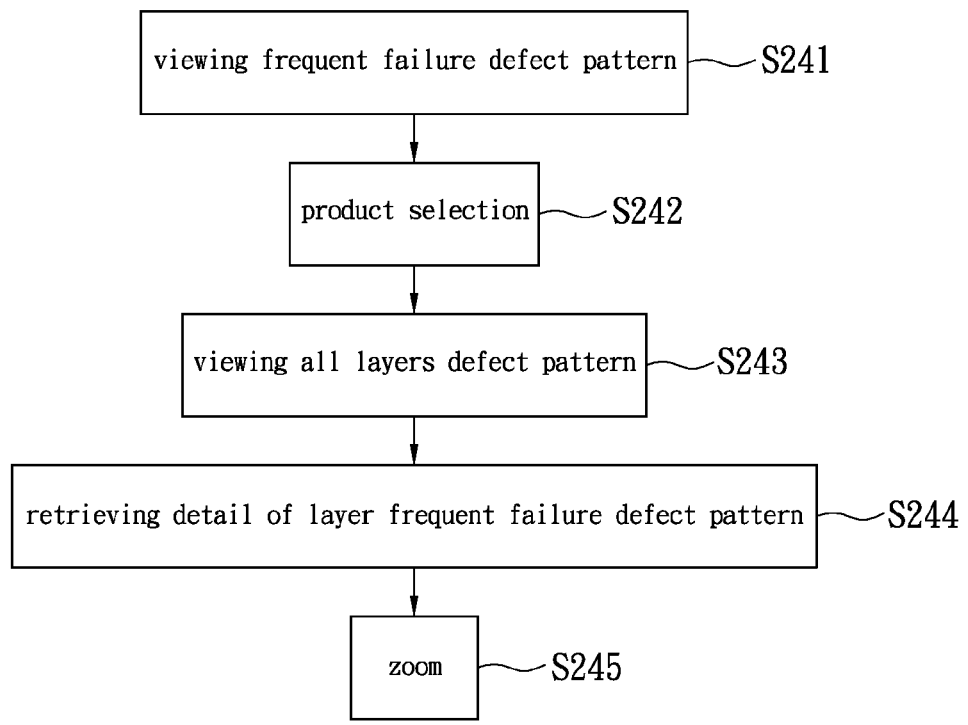
FIG. 24 is a flow chart illustrating viewing frequent failure defect pattern in the integrated interfacing system in accordance with the present invention.

Alternatively, FIG. 24 shows one further flow chart illustrating viewing frequent failure defect pattern. After the system acquires the frequent failure defect pattern(s), the users are allowed to view the frequent failure defect pattern(s) (step S241) through the web interface. Then one or more product selections are provided by implementing the icons shown on the web page. The user may select one of the products (step S242). In response to the selection made by the user, all layers defect pattern are provided for the user to view (step S243).

The user may retrieve the detail of layer frequent failure defect pattern (step S244) through the web interface, and be allowed to view by zooming (step S245).

Figure 25:
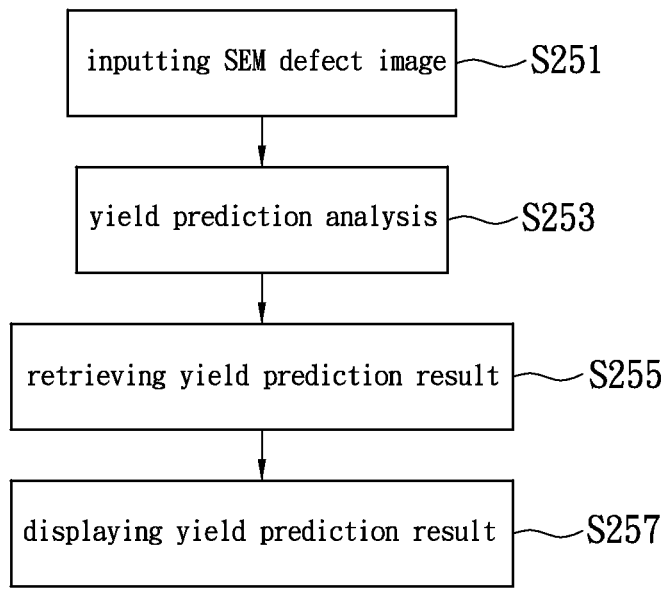
FIG. 25 is a flow chart illustrating yield prediction in the integrated interfacing system in accordance with the present invention.

FIG. 25 is a flow chart illustrating yield prediction in the integrated interfacing system.

The defect images such as SEM optical images are inputted (step S251). The system performs yield prediction analysis (step S253). In an exemplary example, the fabrication plant performs the defect yield prediction for each inspection layer of each wafer of each lot, and preferably the operation is by repeating the mentioned defect screening, sampling, classification, and killer defect analysis. In step S255, the system then retrieves the yield prediction result. The yield prediction result is displayed over the web pages initiated by the web server (step S257).

Figure 26:
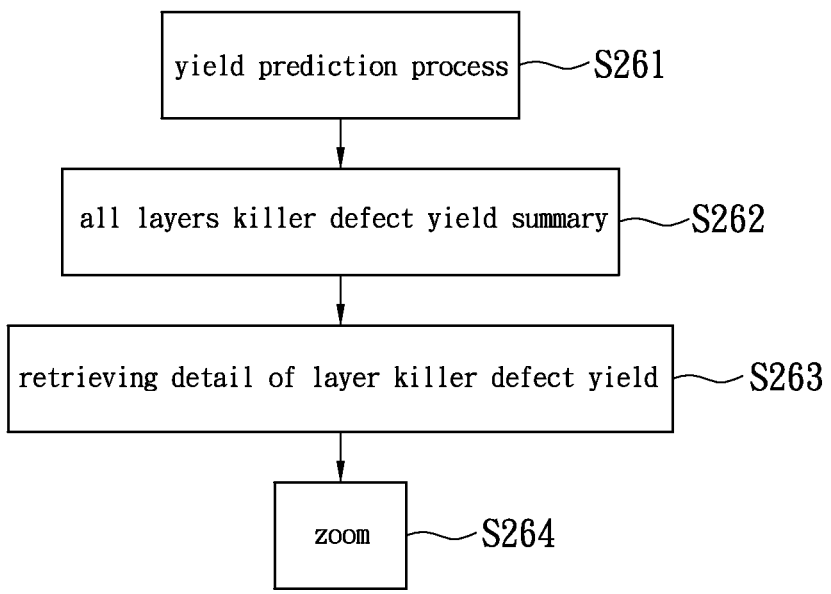
FIG. 26 is a flow chart illustrating killer defect summary in the integrated interfacing system in accordance with the present invention.

FIG. 26 shows a flow chart illustrating killer defect summary in the integrated interfacing system.

The interfacing system firstly performs a yield prediction process (step S261), and generates all layers killer defect yield summary (step S262). By executing the instructions for data mining, the system may retrieve detail of layer killer defect yield (step S263), and the user may view the detail by zooming function (step S264).

Figure 27:
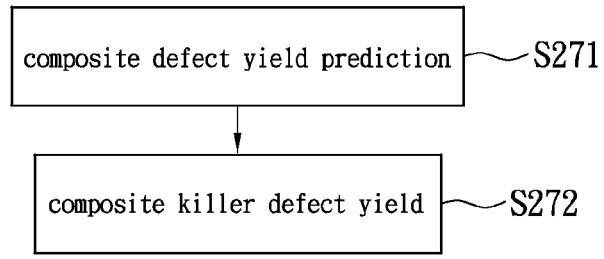
FIG. 27 is a flow chart illustrating composite defect yield in the integrated interfacing system in accordance with the present invention.

FIG. 27 is a flow chart illustrating composite defect yield in the integrated interfacing system.

When the interfacing system performs a composite defect yield prediction (step S271), a composite killer defect yield is acquired (step S272). The composite defect yield prediction undergoes a yield analysis by preferably calculating all inspection layer's defect yield diagnosis data. And the composite defect yield can be updated.

Figure 28:
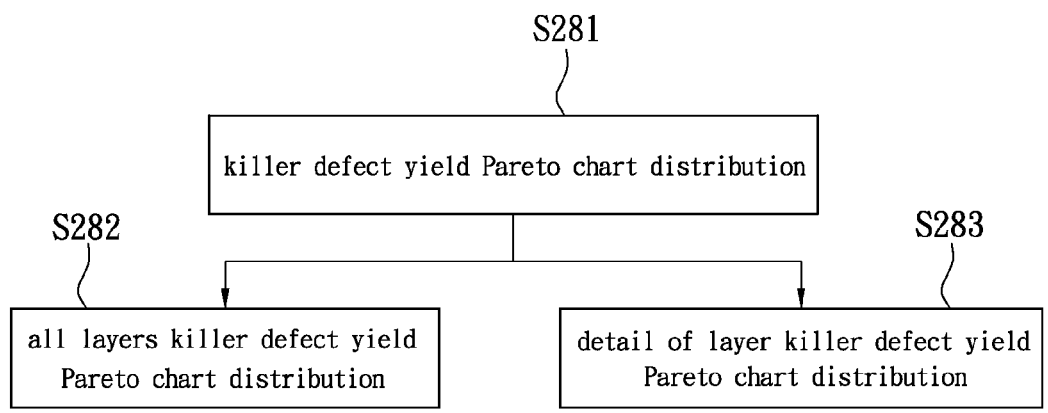
FIG. 28 is a flow chart illustrating defect yield Pareto distribution in the integrated interfacing system in accordance with the present invention.

The defect yield Pareto distribution can be acquired by conducting statistics over the defect analysis. The flow chart shown in FIG. 28 illustrates the process to acquire the distribution. The flow is particularly implemented through the web interface initiated by the web server. In step S281, when the request for killer defect yield Pareto chart distribution is conducted, all layers killer defect yield Pareto chart distribution may be shown on the web page (step S282). Then the detail of layer killer defect yield Pareto chart distribution is acquired (step S283).

Figure 29:
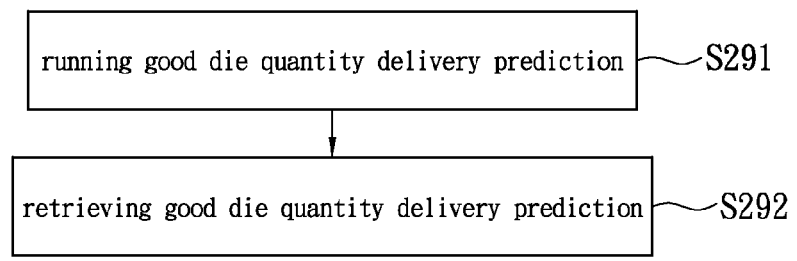
FIG. 29 is a flow chart illustrating good die quantity delivery in the integrated interfacing system in accordance with the present invention.

FIG. 29 is a flow chart illustrating good die quantity delivery in the integrated interfacing system. The system firstly performs good die quantity delivery prediction (step S291), and retrieves good die quantity delivery prediction (step S292).

Figure 30:
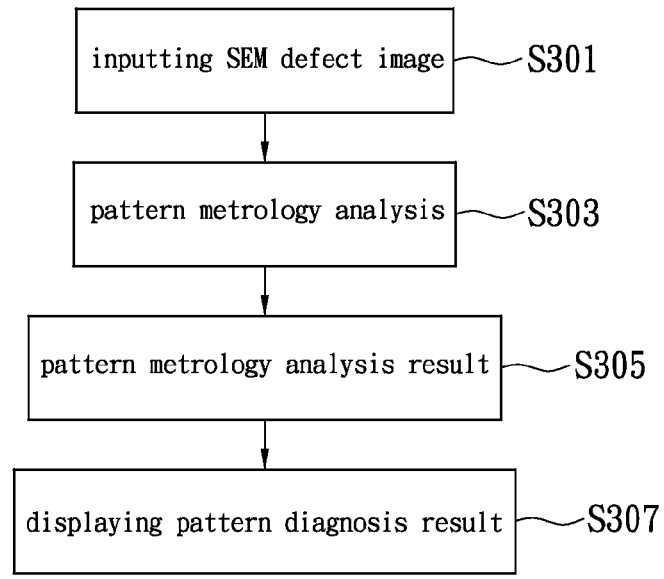
FIG. 30 is a flow chart illustrating pattern metrology in the integrated interfacing system in accordance with the present invention.

FIG. 30 shows a flow chart illustrating pattern metrology in the integrated interfacing system. Through the web interface made by the interfacing system, the SEM defect images are inputted as required in step S301. The system then performs pattern contour metrology analysis (step S303), and acquires pattern contour metrology analysis result (step S305). Finally, the result of the pattern diagnosis is displayed on the web pages (step S307).

Figure 31:
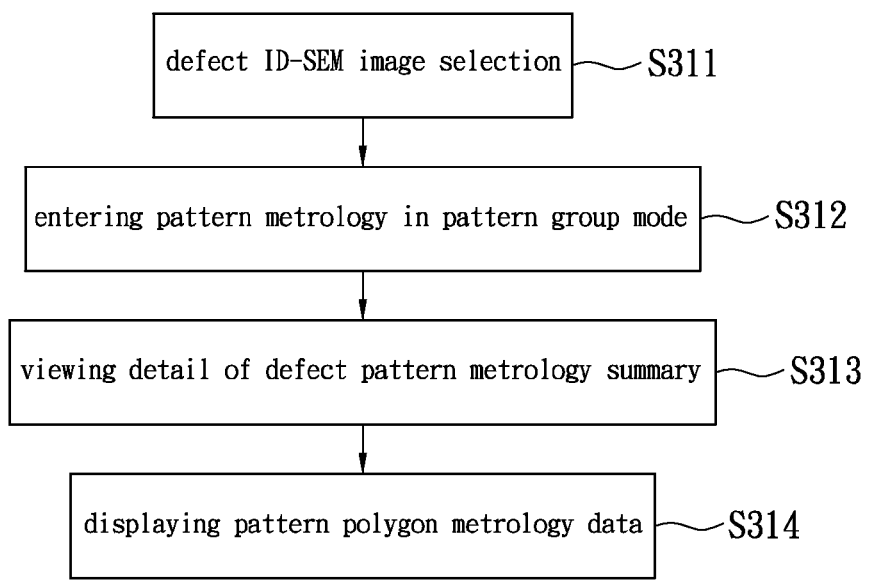
FIG. 31 is a flow chart illustrating viewing defect pattern metrology in the integrated interfacing system in accordance with the present invention.

One of the features of the interfacing system allows the users to view the defect pattern contour metrology over the web pages initiated by the web server, such as the flow illustrated in FIG. 31. In which, the pattern metrology for IC design, in one widely used technique, adopts a signal threshold algorithm to determine the pattern edge, for example, the edge is assumed to be at a signal level half-way between the maximum and the minimum signal. Some other algorithms may also be used to find the signal maximum, and the signal minimum, or other dimensional measurements based on imaging metrology.

Through the pages, the users may enter the function of pattern metrology in pattern group mode as clicking the item shown on the pages (step S311). In response to the users' selection, such as step S312, a defect ID-SEM image selection is made. Then the users may view the detail of defect pattern metrology summary (step S313), and the pattern contour and layout polygon metrology data is displayed and shown for users over the pages (step S314).

Figure 32:
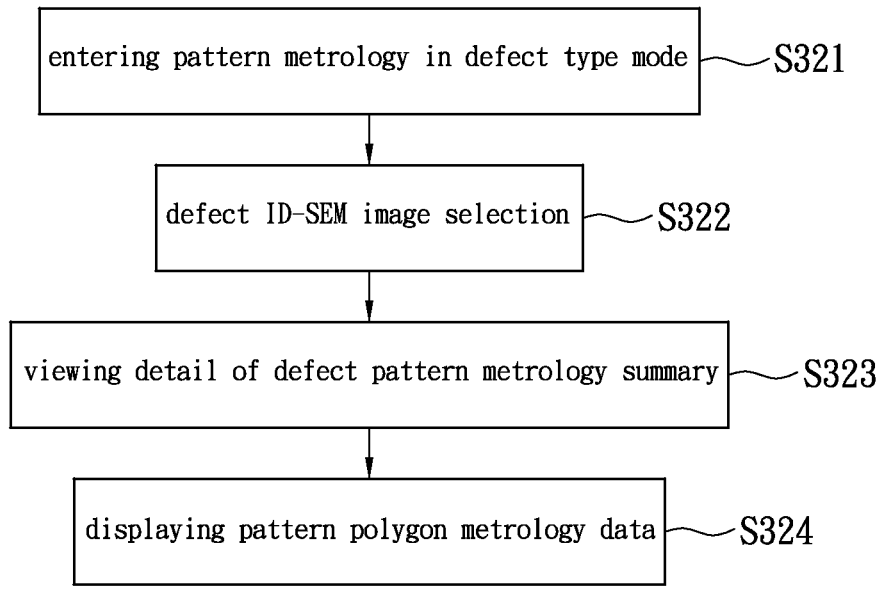
FIG. 32 is a flow chart illustrating pattern metrology in the integrated interfacing system in accordance with the present invention.

Furthermore, such as the flow shown in FIG. 32, the system provides the method to generate the one more pattern metrology shown on the pages in accordance with the present invention.

In step S321, the users are allowed to enter a function showing the pattern metrology in a defect classification mode through the web pages. A defect ID-SEM image selection is made (step S322) as the related icon is clicked. The pages then show up the detail of defect pattern metrology summary for the users to view (step S323). In this viewing mode, the pattern contour and layout polygon metrology data is displayed over the pages (step S324).

Figure 33:
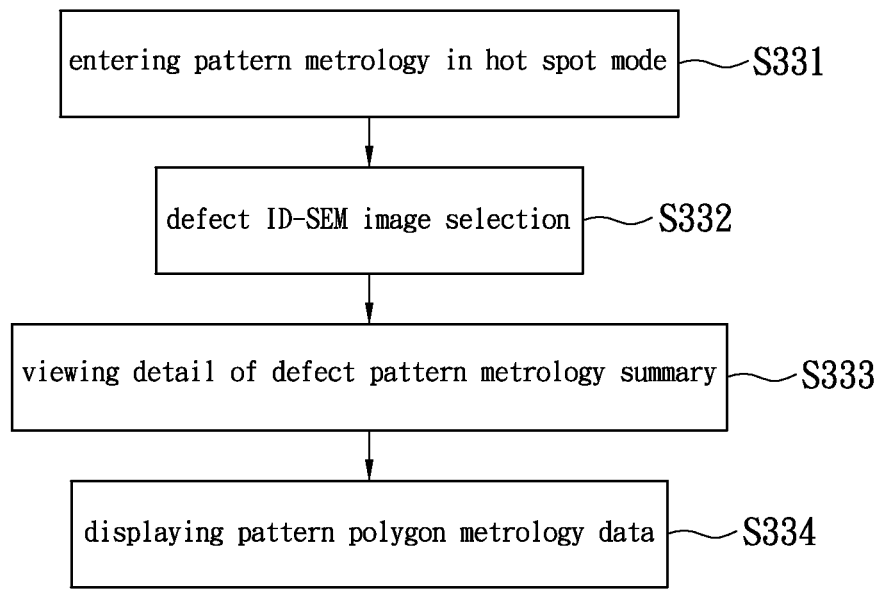
FIG. 33 is a flow chart illustrating pattern metrology in the integrated interfacing system in accordance with the present invention.
Figure 34:
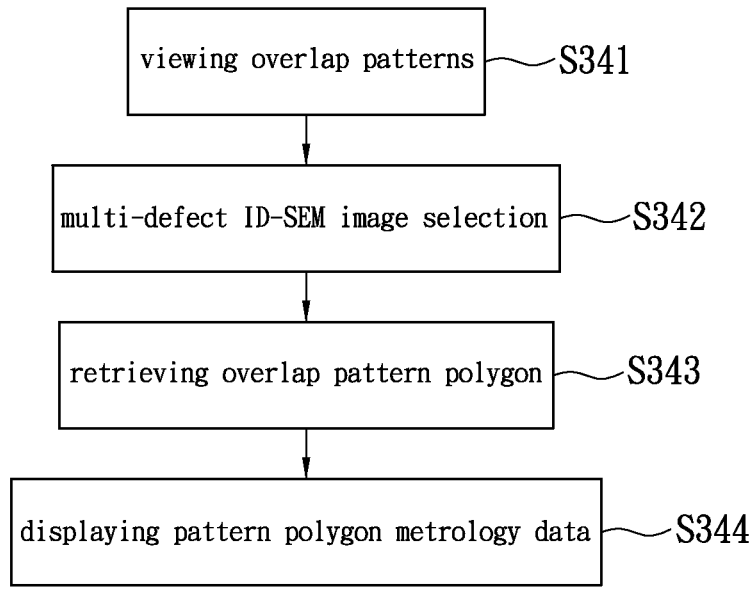
FIG. 34 is a flow chart illustrating displaying pattern polygon metrology data in the integrated interfacing system in accordance with the present invention.

Another viewing mode for the users to view the pattern metrology in the integrated interfacing system is described in FIG. 33.

Similarly, the users may enter the function to view the pattern metrology in a hot spot mode (step S331) as clicking the related item through the web interface. Then a defect ID-SEM image selection is made (step S332), and allowed for the users to view the detail of defect pattern metrology summary (step S333). In the step S334, the pattern contour and layout polygon metrology data is displayed over the web pages initiated by the web server in response to the users' operation.

Further, the pattern contour and layout polygon metrology data related to the IC design is also able to be viewed over the web pages in the integrated interfacing system. Firstly, a function of viewing the overlap patterns is activated in response to the users' operation (step S341). A multi-defect ID-SEM image selection is made over the web interface (step S342). The interfacing system then retrieves the overlap pattern contour and layout polygon from its database after a series of analysis steps (step S343), and initiates the web pages for displaying the pattern contour and layout polygon metrology data over the web pages (step S344).

Figure 35:
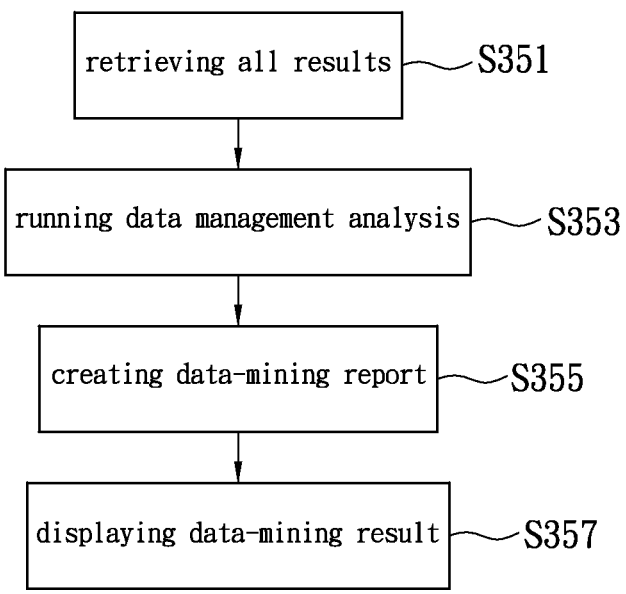
FIG. 35 is a flow chart illustrating displaying data mining result in the integrated interfacing system in accordance with the present invention.

The above mentioned data mining process is a daemon program in the interfacing system for processing any request from the users' operations. The any result from the data mining process is also able to be viewed over the web pages initiated by the web server of the system. FIG. 35 shows a flow chart illustrating displaying data mining result.

The interfacing system firstly retrieves all the results (step S351), and performs a data management analysis (step S353). Through a series of executable instructions, the system creates a data-mining report (step S355), and displays the data-mining result over the web pages (step S357). The web pages are particularly initiated by the web server for showing the content in response to the users' operations.

Figure 36:
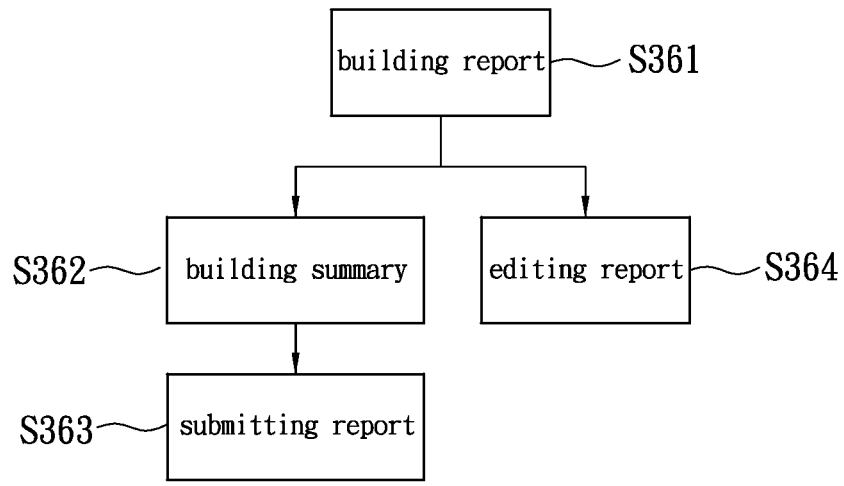
FIG. 36 is a flow chart illustrating creating report in the integrated interfacing system in accordance with the present invention.

In the final steps, the system will create the various reports to the users either through the web pages or printing out as papers. FIG. 36 is a flow chart illustrating creating report in the integrated interfacing system.

In step S361, the system accordingly builds the various reports, and also builds the comprehensive or individual summaries (step S362).

When the reports are submitted over the pages (step S363), the reports are able to be edited (step S364), especially by the authorized users.

Figure 37:
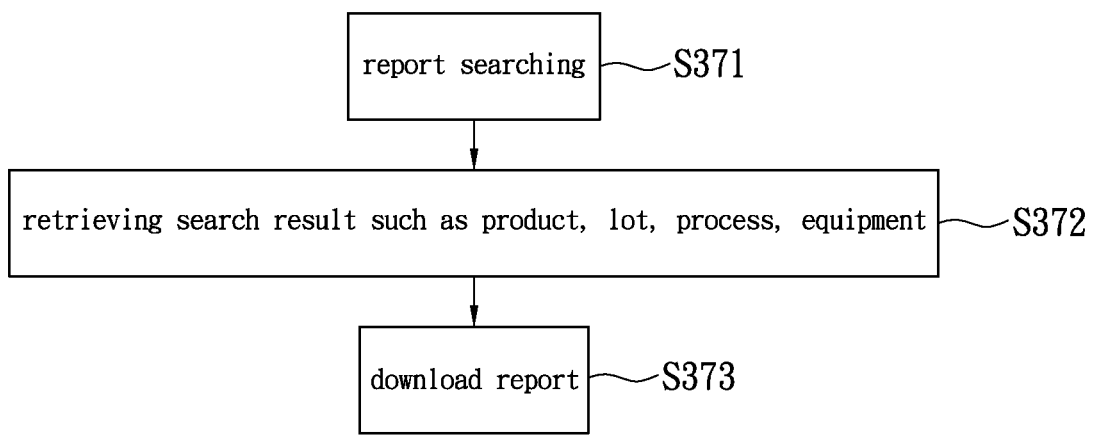
FIG. 37 is a flow chart illustrating report searching in the integrated interfacing system in accordance with the present invention.

The reports are searchable since they are published over the web pages which always activate the searching function. FIG. 37 shows the flow chart illustrating report searching.

The web server initiates a page for providing report searching function for users (step S371). The users may make the searching by inputting some keywords in order to retrieve the search result such as product, lot, process, equipment, etc. (step S372), and download the one or more reports (step S373).

Figure 38:
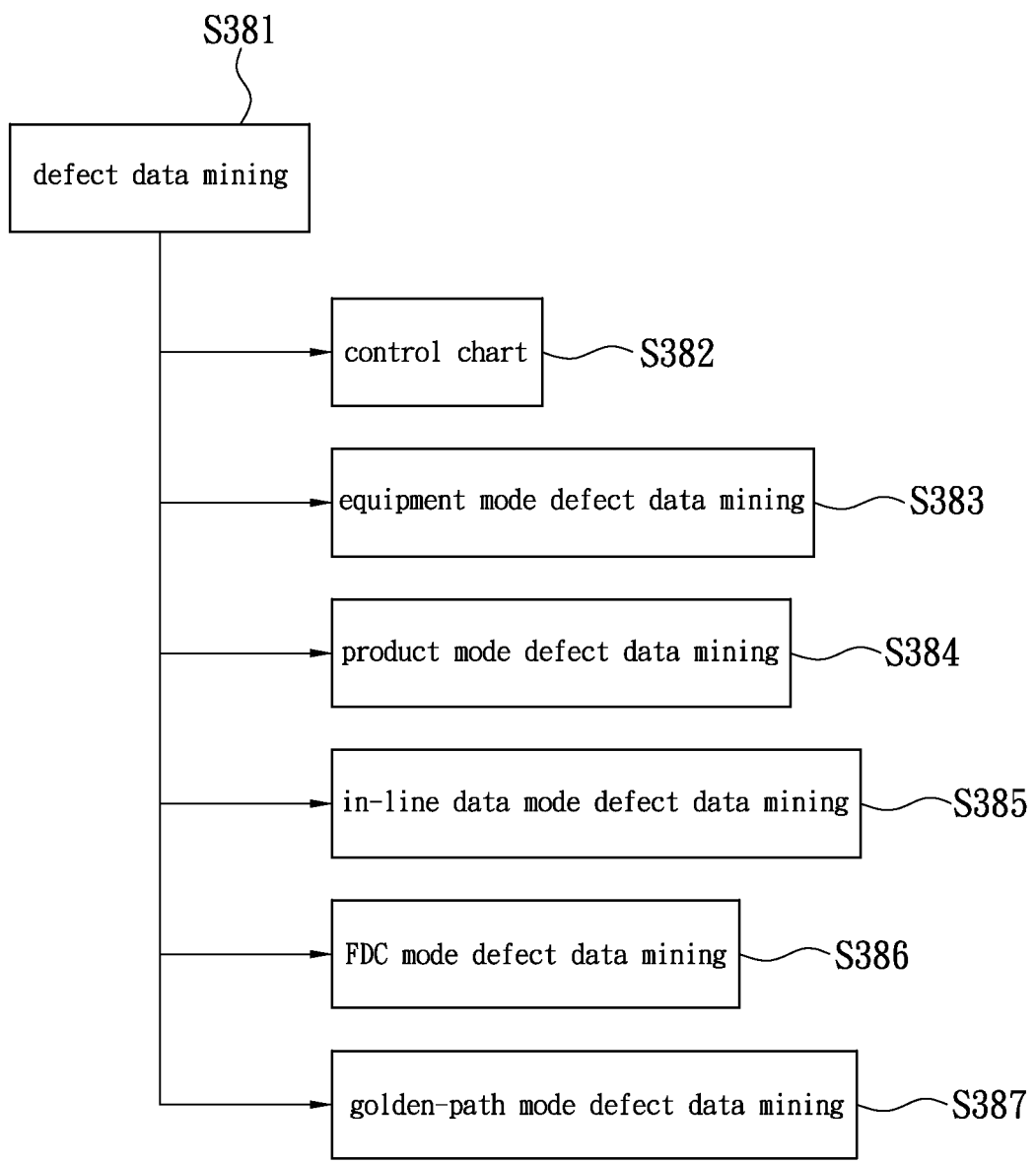
FIG. 38 is a flow chart illustrating defect data mining in the integrated interfacing system in accordance with the present invention.

FIG. 38 shows a flow chart illustrating defect data mining in the integrated interfacing system.

When the interfacing system conducts the report generation and searching services, the system performs the defect data mining (step S381). The relevant instructions are activated to execute a control chart (step S382), an equipment mode defect data mining (step S383), a product mode defect data mining (step S384), an in-line data mode defect data mining (step S385), a FDC mode defect data mining (step S386), and a golden-path mode defect data mining (step S387).

In one further feature of the interfacing system, the system provides a full-chip manufacturing contour pattern viewer for viewing the full chip contour pattern based on the coordinates of the defects discovered in the manufacturing procedure. The exemplary examples of the defect types may be referred to FIG. 39 which shows a diagram of a full chip viewed by the viewer by various methods.

Through the metrology analysis, the classification with some defect contours and pattern contours of a specified sample may be shown up by layers. FIG. 39(a) schematically shows the pattern of defects formed on the full chip. Further, in order to determine the locations of the hot spot pattern defects, the defect reviewing may be made based on the hot spots exemplarily shown in FIG. 39(b). The hot spots shown in FIG. 39(b) are used to identify the potential defect patterns since that pattern thereof may turn into the big yield loss. Through a screening method, the layout-based pattern group may also be shown up by the full-chip viewing, such as the diagram shown in FIG. 39(c). The diagram exemplarily includes some types of the layout-based pattern groups, such as LPG1, LPG2, and LPG3.

In view of the above steps for displaying the pattern polygon metrology data, especially through the interfacing system, the defect pattern may be made by the cumulative lots analysis, such as using the layout based defect pattern group analysis. For example, in FIG. 39(d), which schematically shows the cumulative diagram with defects and pattern contours. The tool such as pattern diagnosis of the interfacing system is performed to measure the pattern contour, which is cumulated with the defects by a defect contour viewer. FIG. 39(e) then shows the pattern contours being described by the polygons through pattern polygon metrology under a viewing mode. After that, the layout polygons and the defect contours are cumulated for users' viewing, such as the diagram shown in FIG. 39(f).

In the manufacturing process of the wafer, the image of each layer is taken by the photographing equipment for measuring the yield of defects. After the images are cumulatively generated, the images of multiple layers may be positioned using their coordinates. Therefore, the full-chip image may be implemented by aligning the layer images and recombined along the edges of the images for allowing having an overlook.

Figure 40:
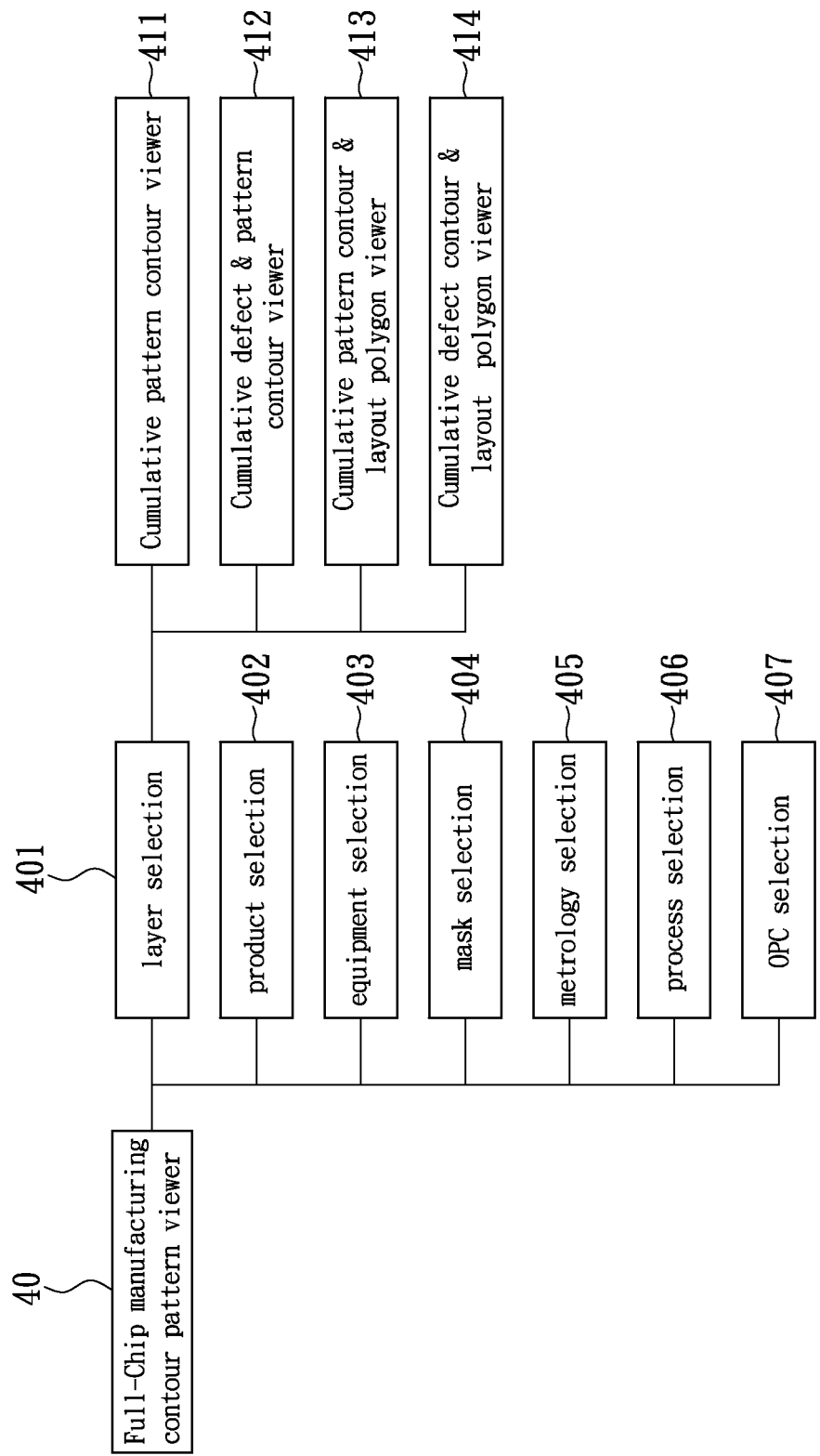
FIG. 40 schematically shows a diagram of a full-chip viewing page made by the interfacing system.

Thus, a full-chip manufacturing contour pattern viewer is especially introduced into the interfacing system of the invention. This full-chip viewing method is processed over the data retrieved during the wafer manufacturing procedure. In the functions provided in this viewer, multiple selections are provided for users to have an overlook a full chip contour pattern by various viewings. In an exemplary example of the viewing tool, as shown in FIG. 40, the interfacing system in accordance with the invention uses a web server to initiate a web interface of this full-chip manufacturing contour pattern viewer 40. The full-chip viewing functionality is activated through the web server having memory for storing the related computer-executable instructions. It is noted that the full-chip viewing function is performed during the wafer manufacturing procedure.

Figure 39:
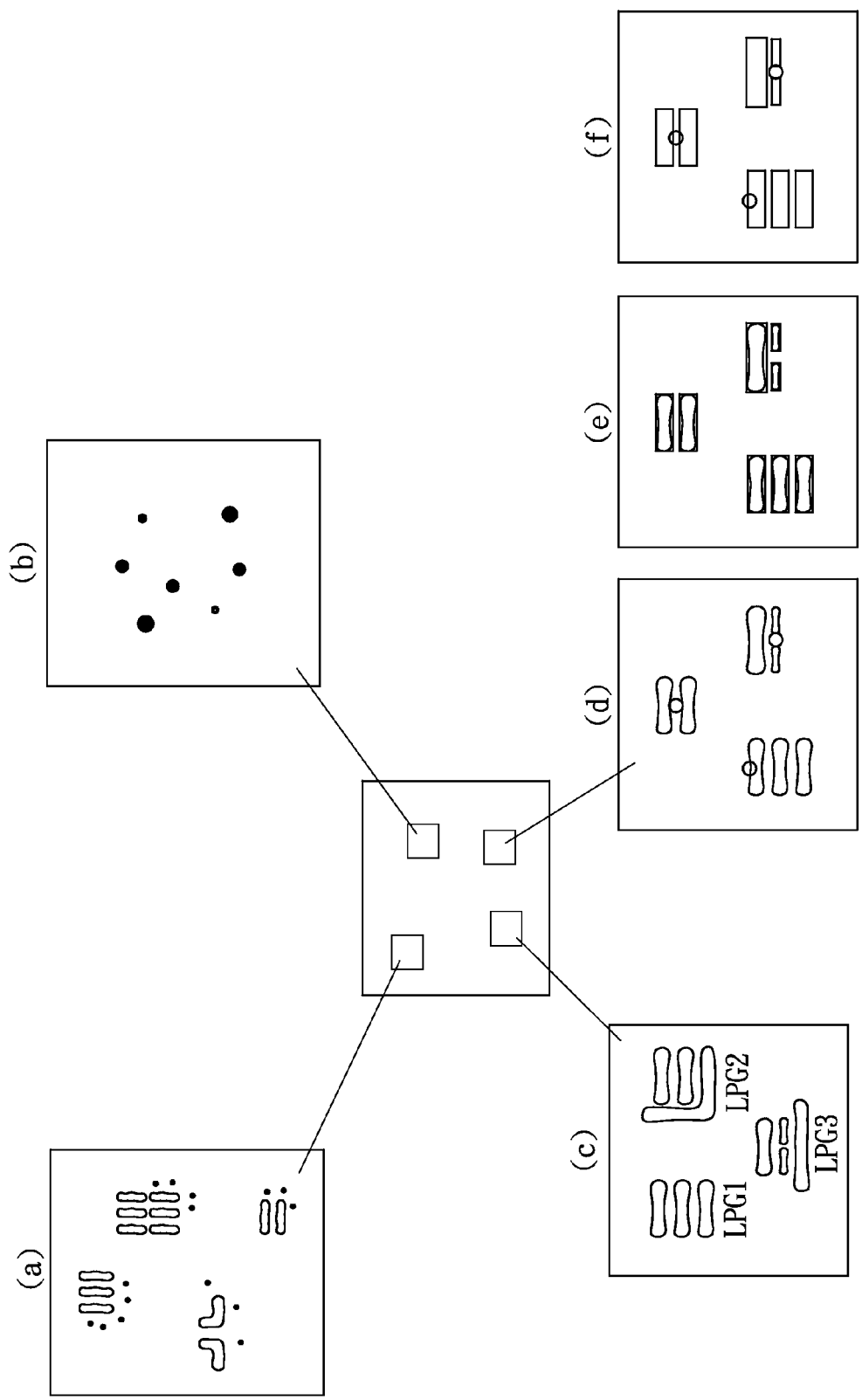
FIG. 39 schematically shows a diagram of a full chip viewed by a viewer of the interfacing system.

In detail, the viewing tool 40 provides a plurality of functionalities such as the layer selection 401, product selection 402, equipment selection 403, mask selection 404, metrology selection 405, process selection 406, and OPC (Optical Proximity Correction) selection 407 which are implemented through the web interface initiated by the web server. In which, the layer selection 401 is provided for users to select from the items accompanied with the full-chip manufacturing contour pattern viewer 40, and the related page may guide the users to select one of layers to be viewed. The FIG. 39 is one of the exemplary examples thereof.

Further, the product selection 402 is provided for users to select one of the products to be viewed through its full-chip viewing tool and know product specific defect pattern. The equipment selection 403 is provided for the viewer to show the distribution and difference of defects appeared for each or many equipment for the wafer manufacturing. The mask selection 404 may be allowed for the users to view the defects by selecting the one or more masks used in the manufacturing steps. The metrology selection 405 is provided for users to view the metrology analysis by their selection, especially to view the hot patterns under this full-chip viewing scheme. Further, the process selection 406 is provided for viewing the defect distribution for each or many selected processes. Still further, the OPC (Optical Proximity Correction) selection 407 is one the tools for users to process the full-chip viewing and judge the best optimal OPC recipe, especially the optical proximity correction (OPC) becomes a standard procedure for printing deep subwavelength features in current wafer/ mask manufacturing.

When users select one of the above described items to be viewed, some further functionalities for each viewing item are initiated by the web interface. Users may then view the various defects status according to the selection of those viewing tools. The further viewing tools for the full-chip manufacturing contour pattern viewer includes a cumulative pattern contour viewer 411 for viewing cumulate patterns of one or more selected items including one of the layers, products, equipment, masks, metrological matters, processes and OPCs. The tool can be a cumulative defect/pattern contour viewer 412 for viewing cumulate detects and pattern contours of one or more selected items. The tool can also be a cumulative pattern contour/layout polygon viewer 413 for viewing cumulate pattern contours and layout polygons of one or more selected items. And a cumulative defect contour/layout polygon viewer 414 may be incorporated for users to viewing cumulate detect contours and layout polygons of one or more selected items.

Figure 41:
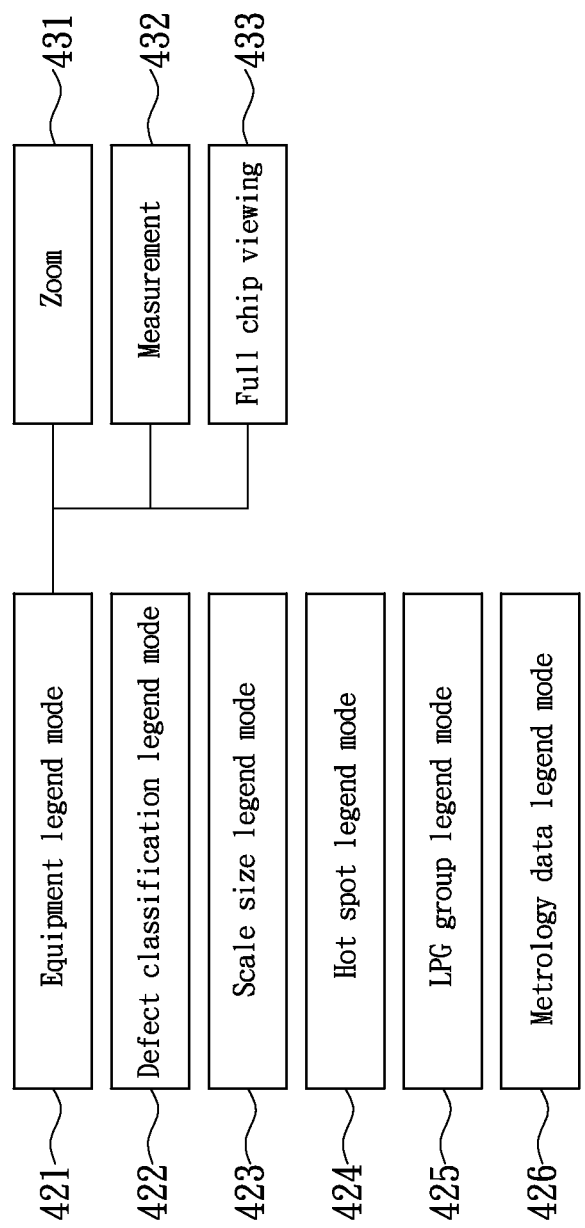
FIG. 41 schematically shows further page describing the functions of the full-chip viewing in accordance with the present invention.

The full-chip manufacturing contour pattern viewer 40 provides some viewing modes shown in FIG. 41 for users to conduct the full-chip viewing. The shown viewing modes can be displayed on the web page for users to make a selection. Those viewing modes are corresponding to foregoing selections such as the layer selection 401, product selection 402, etc. After the user chooses one of the viewers (411, 412, 413, 414) for cumulate data, the full-chip manufacturing contour pattern viewer 40 then provides equipment legend mode 421, a defect classification legend mode 422, a scale size legend mode 423, a hot spot legend mode 424, a LPG group legend mode 425, and a metrology data legend mode 426 for users to view the various types of defects and patterns.

The final pages for this full-chip viewing scheme are for users to have an overall viewing for the various defect types and status through the user interface. The further tools such as zoom (431), measurement (432), and full chip viewing (433) are also provided.

To sum up, the invention is related to an integrated interfacing system and a method for the intelligent defect yield solutions, in particular, the multiple yield-improvement functions are integrated into one platform which initiates a series of web pages for users to view and to operate. The yield rate improvement is performed under a data mining scheme for semiconductor manufacturing. Through the smart pages of viewing and analyzing functionalities, the users may therefore acquire the information rapidly and conveniently.

It is worth noting that the above-described integrated interfacing platform, exemplarily a web site, can be applied to semiconductor fab, assembly, flat panel display fab, solar fab, LED, PCB fab, and mask fab.

It is intended that the specification and depicted embodiment be considered exemplary only, with a true scope and spirit of the invention being indicated by the broad meaning of the following claims.

What is claimed is:

1. An integrated interfacing system for intelligent defect yield solutions, comprising:
   a web server, initiating a web interface for containing a plurality of functional items provided for clicking to activate one or more corresponding functionalities;
   a memory having computer-executable instructions for selectively performing the corresponding functionalities including:
   means for defect to layout coordinate conversion for acquiring layout coordinates of defects;
   means for dashboard summary serving to review information of categories of wafer lots;
   means for defect screening performing screening the defects based on layout pattern and defect size at an earlier stage;
   means for defect sampling performing sampling the defects based on layout pattern, equipment, mask and design weak spot;
   means for defect yield diagnosis identifying random particles, systematic defects, and defect classification;
   means for design-for-yield improving the wafer yield based on a systematic defect pattern library, design for manufacturing, layout base, and a frequent failure defect pattern library;
   means for yield prediction for determining cost for chip fabrication, estimating number of good die quantity delivery, and identifying a new design;
   means for pattern diagnosis performing pattern contour measurement in defect classification mode, layout pattern group mode, hot spot mode, and overlap multiple contour mode;
   means for data management for creating a report and performing data mining; and
   means for system administration for administrating operations of the web server including system configuration and user management.

2. The integrated interfacing system of claim 1, wherein the dashboard summary is made by a dashboard summary module within the web server provided for viewing a low-yield lot, a R&D lot, a pilot product, a combo chip lot, customized functional lot, and a search result.

3. The integrated interfacing system of claim 2, wherein the viewing on a web page initiated by the web server is based on one or more filtering conditions including a designated date period, product selection, equipment selection, and related process.

4. The integrated interfacing system of claim 1, wherein the defect screening is made by a defect screen module within the web server based on further information of layout based including layout-based defect composite pattern group, layout pattern group Pareto chart distribution, defect size Pareto chart distribution, and focus-exposure matrix diagram.

5. The integrated interfacing system of claim 1, wherein the defect sampling is made by a defect sample module within the web server based on further information of dummy pattern, layout pattern group, equipment, mask, design weak spot, and nuisance.

6. The integrated interfacing system of claim 1, wherein the defect yield diagnosis is made by a defect yield diagnosis module within the web server which identifies the random particle, the systematic defect, defect classification, and provides one or more process parameters related to the defect type, defect yield, defect composition, and defect distribution.

7. The integrated interfacing system of claim 1, wherein the design-for-yield is made by a design-for-yield module within the web server which performs a pattern matching based on the systematic defect pattern library and the frequent failure defect pattern library.

8. The integrated interfacing system of claim 1, wherein the yield prediction is made by a yield prediction module within the web server which is performed based on a all-layers killer defect yield summary.

9. The integrated interfacing system of claim 1, wherein the pattern diagnosis is made by a pattern diagnosis module within the web server which is performed to execute pattern contour metrology analysis in defct classification mode, layout pattern group mode, hot spot mode, and pattern overlap analysis mode.

10. The integrated interfacing system of claim 1, wherein the data management is made by a data management module within the web server which provides a report creating tool, a search tool, a defect data mining tool, and a defect control chart tool.

11. The integrated interfacing system of claim 1, wherein the system administration is made by a system administration module within the web server which provides an administration tool and a user management tool.

12. An integrated interfacing method for intelligent defect yield solutions, comprising:
    initiating a web interfacing service by a web server of an integrated interfacing system, wherein the web browsing service initiates a web page for containing a plurality of functional items provided for clicking to activate one or more corresponding functionalities;
    inputting a defect scan file or a design layout;
    performing defect screening;
    analyzing the defects and creating a result file;
    creating and displaying a summary related to the result onto the web page;
    in response to the summary, performing conditions filtering;
    making a selection of lot number and wafer ID;
    performing defect screening;
    performing defect sampling;
    performing defect classification;
    performing yield prediction;
    performing design for yield; and
    performing pattern diagnosis.

13. The method of claim 12, wherein the summary is a defect screen summary, comprising:
    a wafermap including layout pattern group and defect size group;
    a die base including reticle, single module die, and single module wafer;
    a layout base including layout-based pattern group;
    a Pareto chart distribution including layout pattern group Pareto chart distribution, and defect size Pareto chart distribution; and
    a focus-exposure matrix including a focus-exposure matrix diagram.

14. The method of claim 12, wherein the summary is a defect sample summary, comprising:
    a sample summary having selected group detail;
    a dummy pattern having dummy group detail;
    a layout pattern having layout pattern group detail;
    equipment having equipment and process group detail;
    mask having mask group detail;
    design weak spot having design weak spot detail; and
    nuisance with nuisance group detail.

15. The method of claim 12, wherein the summary is a defect classification summary, comprising:
    defect classification including all-layers defect classification, layer defect classification detail, and defect type detail;
    defect-type Pareto chart distribution including lot/wafer defect-type Pareto chart distribution; layer defect classification detail, process defect-type Pareto chart distribution, and equipment defect-type Pareto chart distribution.

16. The method of claim 12, wherein after the step of inputting the defect scan file, the method further comprises:
    performing yield prediction analysis;
    retrieving yield prediction result; and
    displaying yield prediction result.

17. The method of claim 16, further comprising:
    performing pattern metrology analysis to the pattern contour to identify hot spot pattern according to the yield prediction.

18. The method of claim 12, wherein after the step of inputting the design layout, the method further comprises:
    performing yield prediction process;
    creating all layers killer defect yield summary; and
    retrieving detail of layer killer defect yield.

19. The method of claim 12, wherein the filtering conditions include date, product, equipment and process.

20. An integrated interfacing system, comprising:
    a web server, initiating a web interface of a full-chip manufacturing contour pattern viewer;
    a memory having computer-executable instructions for performing a full-chip viewing as in a manufacturing procedure, wherein the full-chip manufacturing contour pattern viewer provides a plurality of functionalities including:
    means for full-chip viewing by layers, provided for users to select one of the layers;
    means for full-chip viewing by products, provided for users to select one of the products;
    means for full-chip viewing by equipment, provided for users to select one equipment;
    means for full-chip viewing by masks, provided for users to select one of the masks;
    means for full-chip viewing with metrology analysis, provided for users to perform full-chip viewing of hot spot patterns;
    means for full-chip viewing by processes, provided for users to select one of the processes; and
    means for full-chip viewing with an optical proximity correction (OPC).

21. The integrated interfacing system of claim 20, wherein the each functionality of the full-chip manufacturing contour pattern viewer further comprises:
    a cumulative pattern contour viewer for viewing cumulate patterns of one or more selected items including one of the layers, products, equipment, masks, metrological matters, processes and OPCs;

a cumulative defect/pattern contour viewer for viewing cumulate detects and pattern contours of one or more selected items;

a cumulative pattern contour/layout polygon viewer for viewing cumulate pattern contours and layout polygons of one or more selected items; and a cumulative defect contour/layout polygon viewer for viewing cumulate detect contours and layout polygons of one or more selected items.

22. The integrated interfacing system of claim 21, wherein each of the viewers includes at least one viewing mode as shown in the web interface, and the viewing mode is selected from:

an equipment mode;
a defect classification mode;
a scale size mode;
a hot spot mode;
a LPG mode; and
a metrology data mode.

23. The integrated interfacing system of claim 22, wherein the full-chip viewing method is processed over the data retrieved during the wafer manufacturing procedure.

* * * * *